United States Patent [19]
Bloom

[11] Patent Number: 5,970,749
[45] Date of Patent: Oct. 26, 1999

[54] ARRANGEMENT FOR AUTOMATED FABRICATION OF FIBER OPTIC DEVICES

[76] Inventor: Cary Bloom, 251 Blaze Climber Way, Rockville, Md. 20850

[21] Appl. No.: 08/916,177

[22] Filed: Aug. 21, 1997

Related U.S. Application Data

[62] Division of application No. 08/763,122, Dec. 10, 1996.
[51] Int. Cl.$^6$ .................................................. C03B 37/028
[52] U.S. Cl. ............................... 65/378; 65/381; 65/411; 65/409; 65/501
[58] Field of Search ............................. 65/378, 381, 411, 65/409, 501

[56] References Cited

U.S. PATENT DOCUMENTS

| | | |
|---|---|---|
| Re. 33,296 | 8/1990 | Stowe et al. . |
| Re. 34,955 | 5/1995 | Anton et al. . |

(List continued on next page.)

FOREIGN PATENT DOCUMENTS

| | | |
|---|---|---|
| 0293289 | 5/1988 | European Pat. Off. . |
| 2235043 | 8/1990 | United Kingdom . |
| WO87/00934 | 7/1986 | WIPO . |
| 0215668A2 | 9/1986 | WIPO . |

OTHER PUBLICATIONS

"Automated Fabrication of Fused Fibre Optic Couplers", by Robert Frank Swain, M.Phil dissertation published by the Heriot–Watt University, Edinburgh, Ireland, 1993.
"Tapered Optical Fiber Components and Sensors", by L.C. Bobb, et al., Microwave journal, May 1992.
"The Shape of Fiber Tapers", by T.A. Birks et al., Journal of Lightwave Technology, IEEE, vol. 10, No. 4, Apr. 1992, pp. 432–438.
"Mass Production of Fused Couplers and Coupler Based Devices", by W.E. Moore et al.
"Loss and Spectral Control in Fused Tapered Couplers", by K.P. Oakley et al., Optical Engineering, vol. 33, No. 12, Dec. 1994, pp. 4006–4019.
"Control of Optical Fibre Taper Shape", Electronics Letters, vol. 27, No. 18, Aug. 29, 1991.
"Fiber–Coupler Fabrication with Automatic Fusion–Elongation Processes for Low Excess Loss and High Coupling–Ratio Accuracy", by I. Yokohama, et al., Journal of Lightwave Technology, IEEE, vol. LT–5, No. 7, Jul. 1987. IC Assembly Technology, pp. 3–26–3–32.
Fibre–optic Coupler Fabrication at AOFR, by A.J. Stevenson et al., International Journal of Optoelectronics, vol. 6, Nos. 1/2, 1991, pp. 127–144.
"From your space . . . to outer space", Fibre Bragg Gratings, 3M Innovation, Circle No. 76.
"100ips & 2 microns", Anorad linear motor gantries, Anorad Corporation, Circle 7.
"1 $\mu$m, 2g, 3m/s", Anorad LW linear motor stages, Anorad Corporation, Circle 7.

(List continued on next page.)

*Primary Examiner*—John Hoffmann
*Attorney, Agent, or Firm*—Iran H. Donner Pepper Hamilton LLP

[57] ABSTRACT

Fiber optic devices are manufactured in an automated environment using a combination of clamps to secure the optical fibers and movable gripping devices that transport the optical fiber during the fabrication process while maintaining control of the ends of the optical fibers. An optical fiber from a spool is removed by a despooling arm having a gripping device, and moveable grippers thread the optical fiber into a set of clamps and place the end of the optical fiber in a clamp designed to splice the fiber optic end to a lead of a testing device. The fiber optic device is formed by dynamically controlling the heating and pulling process based on detected coupling ratios, and hermetically sealed while secured within the clamps. The sealed fiber optic device is moved for testing or packaging using a transport arm having a series of clamps to maintain the position of the fiber optic device and the ends of the leads of the fiber optic device.

6 Claims, 14 Drawing Sheets

5,970,749
Page 2

U.S. PATENT DOCUMENTS

| | | |
|---|---|---|
| 3,854,003 | 12/1974 | Duret . |
| 4,026,632 | 5/1977 | Hill et al. . |
| 4,597,338 | 7/1986 | Thorncraft et al. . |
| 4,611,894 | 9/1986 | Roberts . |
| 4,699,453 | 10/1987 | Roberts . |
| 4,701,010 | 10/1987 | Roberts . |
| 4,714,316 | 12/1987 | Moore et al. . |
| 4,763,977 | 8/1988 | Kawasaki et al. . |
| 4,772,085 | 9/1988 | Moore et al. . |
| 4,779,945 | 10/1988 | Hill et al. . |
| 4,792,203 | 12/1988 | Nelson et al. . |
| 4,798,438 | 1/1989 | Moore et al. . |
| 4,834,481 | 5/1989 | Lawson et al. . |
| 4,895,423 | 1/1990 | Bilodeau et al. . |
| 4,900,119 | 2/1990 | Hill et al. . |
| 4,906,068 | 3/1990 | Olson et al. . |
| 4,923,273 | 5/1990 | Taylor . |
| 4,995,688 | 2/1991 | Anton et al. . |
| 4,997,243 | 3/1991 | Aiki et al. . |
| 4,997,245 | 3/1991 | DuPuy et al. . |
| 4,997,247 | 3/1991 | Stowe . |
| 4,997,248 | 3/1991 | Stowe . |
| 4,997,252 | 3/1991 | Sugawara et al. . |
| 4,997,253 | 3/1991 | Enochs . |
| 5,013,117 | 5/1991 | Fukuma . |
| 5,013,121 | 5/1991 | Anton et al. . |
| 5,028,110 | 7/1991 | Plummer . |
| 5,031,994 | 7/1991 | Emmons . |
| 5,037,176 | 8/1991 | Roberts et al. . |
| 5,066,149 | 11/1991 | Wheeler et al. . |
| 5,067,678 | 11/1991 | Henneberger et al. . |
| 5,093,885 | 3/1992 | Anton . |
| 5,121,453 | 6/1992 | Orazi et al. . |
| 5,123,219 | 6/1992 | Beard et al. . |
| 5,136,121 | 8/1992 | Kluska et al. . |
| 5,157,751 | 10/1992 | Maas et al. . |
| 5,159,655 | 10/1992 | Ziebol . |
| 5,166,992 | 11/1992 | Cassidy et al. . |
| 5,166,994 | 11/1992 | Stowe et al. . |
| 5,179,608 | 1/1993 | Ziebol et al. . |
| 5,179,618 | 1/1993 | Anton . |
| 5,189,723 | 2/1993 | Johnson et al. . |
| 5,208,894 | 5/1993 | Johnson et al. . |
| 5,214,732 | 5/1993 | Beard et al. . |
| 5,214,735 | 5/1993 | Henneberger et al. . |
| 5,222,176 | 6/1993 | Webber et al. . |
| 5,239,604 | 8/1993 | Ziebol et al. . |
| 5,251,002 | 10/1993 | Gryk . |
| 5,261,019 | 11/1993 | Beard et al. . |
| 5,274,731 | 12/1993 | White . |
| 5,283,852 | 2/1994 | Gibler et al. . |
| 5,293,440 | 3/1994 | Miles et al. . |
| 5,293,582 | 3/1994 | Beard et al. . |
| 5,305,405 | 4/1994 | Emmons et al. . |
| 5,316,243 | 5/1994 | Henneberger . |
| 5,317,663 | 5/1994 | Beard et al. . |
| 5,319,728 | 6/1994 | Lu et al. . |
| 5,319,733 | 6/1994 | Emmons et al. . |
| 5,329,600 | 7/1994 | Sasaoka et al. . |
| 5,343,544 | 8/1994 | Boyd et al. . |
| 5,355,426 | 10/1994 | Daniel et al. . |
| 5,363,465 | 11/1994 | Korkowski et al. . |
| 5,367,591 | 11/1994 | Seike et al. . |
| 5,381,497 | 1/1995 | Toland et al. . |
| 5,386,484 | 1/1995 | Ooka et al. . |
| 5,386,488 | 1/1995 | Oikawa . |
| 5,386,490 | 1/1995 | Pan et al. . |
| 5,395,101 | 3/1995 | Takimoto et al. . |
| 5,422,969 | 6/1995 | Eno . |
| 5,432,875 | 7/1995 | Korkowski et al. . |
| 5,445,319 | 8/1995 | Pan et al. . |
| 5,459,598 | 10/1995 | Carrington . |
| 5,463,704 | 10/1995 | Ziebol . |
| 5,475,780 | 12/1995 | Mizrahi . |
| 5,475,782 | 12/1995 | Ziebol . |
| 5,475,784 | 12/1995 | Bookbinder et al. . |
| 5,497,444 | 3/1996 | Wheeler . |
| 5,577,149 | 11/1996 | Averbeck et al. . |
| 5,588,087 | 12/1996 | Emmons et al. . |
| 5,602,952 | 2/1997 | Rashleigh et al. . |

OTHER PUBLICATIONS

"The New Standard for Case Erecting and Sealing", ABC Packaging Machine Corporation, Circle 22.

"All Product Brochure" Schleuniger, Inc., pp. 1–12.

"Schleuniger US 2545 Stripping Machine", Schleuniger, Inc.

"Schleuniger FO 7010 Kelvar Cutting Machine", Schleuniger, Inc.

"Schleuniger PF 1000/PF 2000 Electric Demand Prefeeders", Schleuniger, Inc.

"CP 1200 Coiling Unit", Schleuniger, Inc.

"Schleuniger WS 1500/CP 1250 Wire Stacker/Coiling Pan", Schleuniger, Inc.

"Premise Wiring Communication Fiber Optics", Fiber Instrument Sales Inc. 15th Edition, 1997, pp. 1–68.

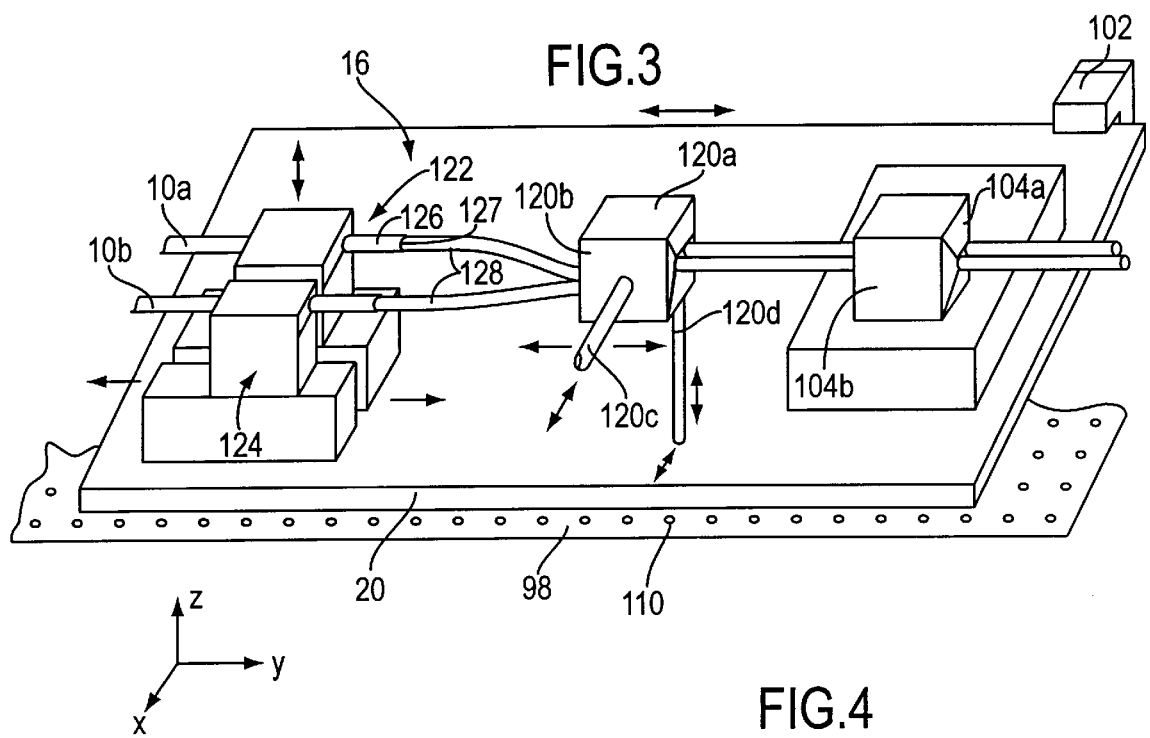
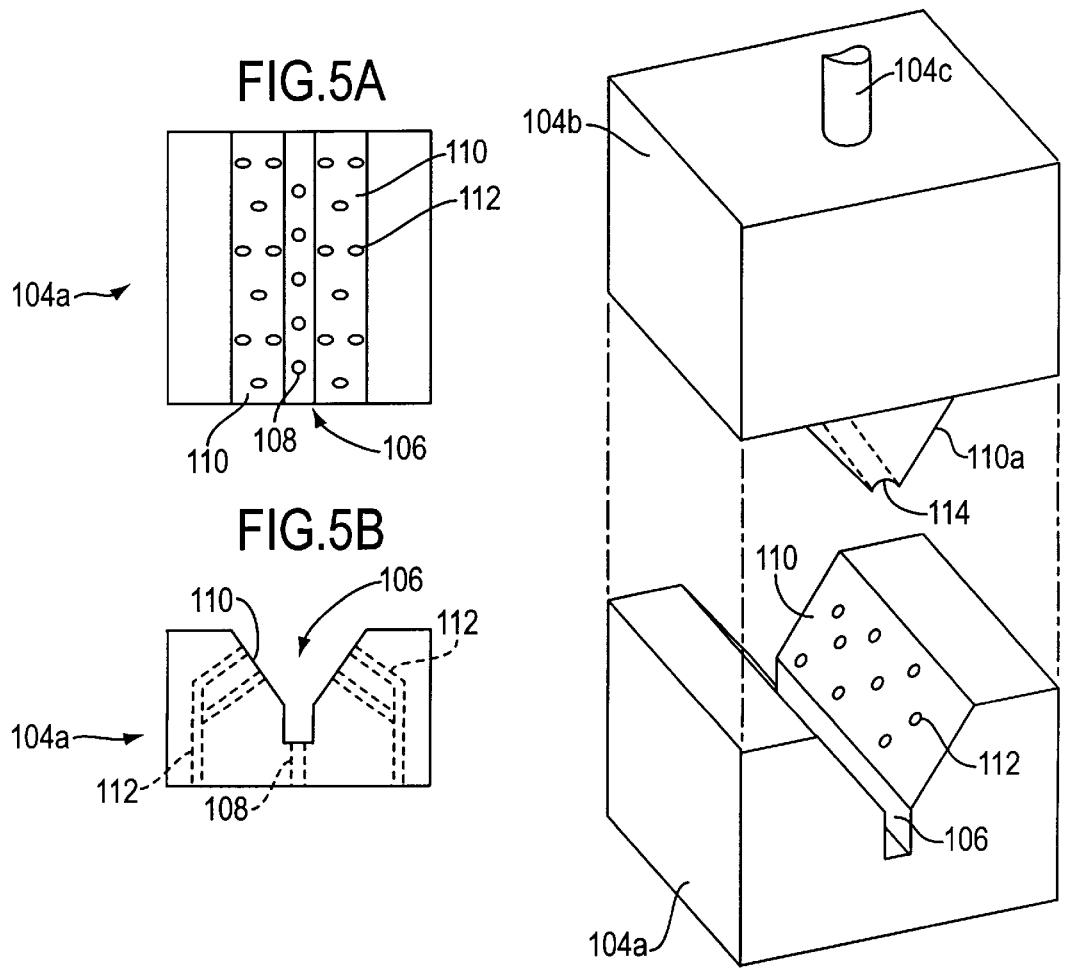

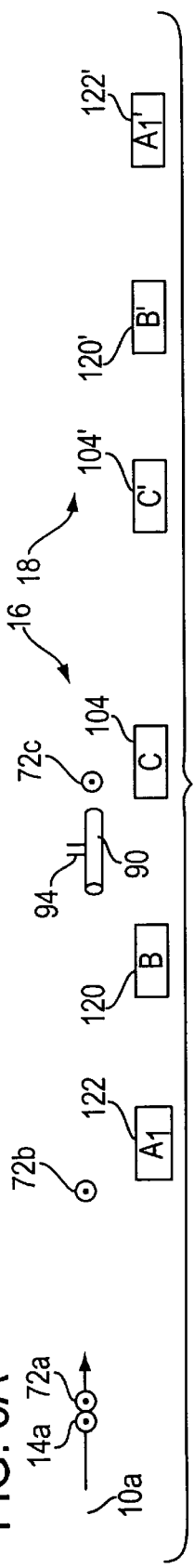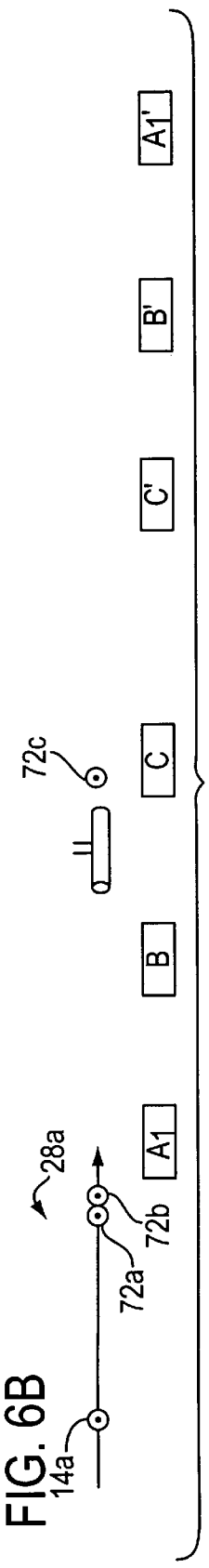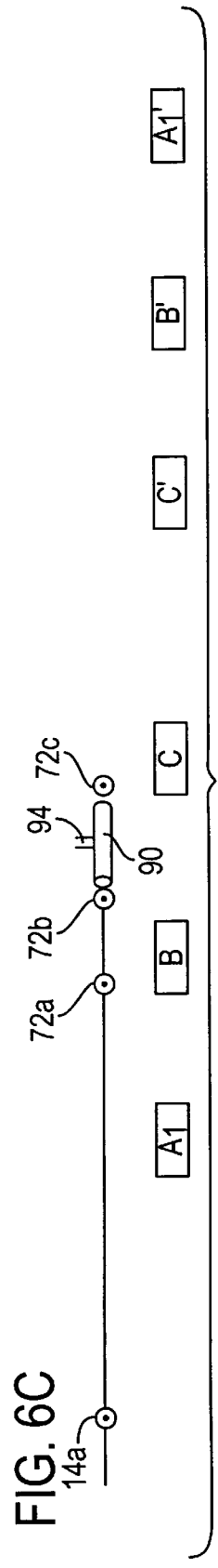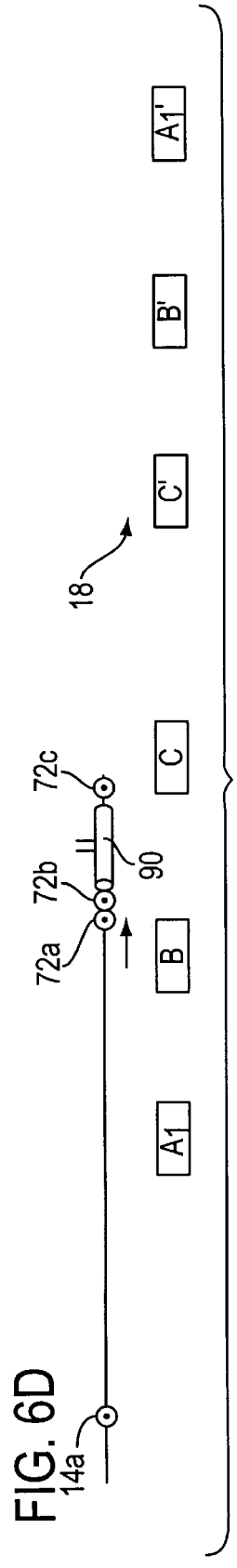

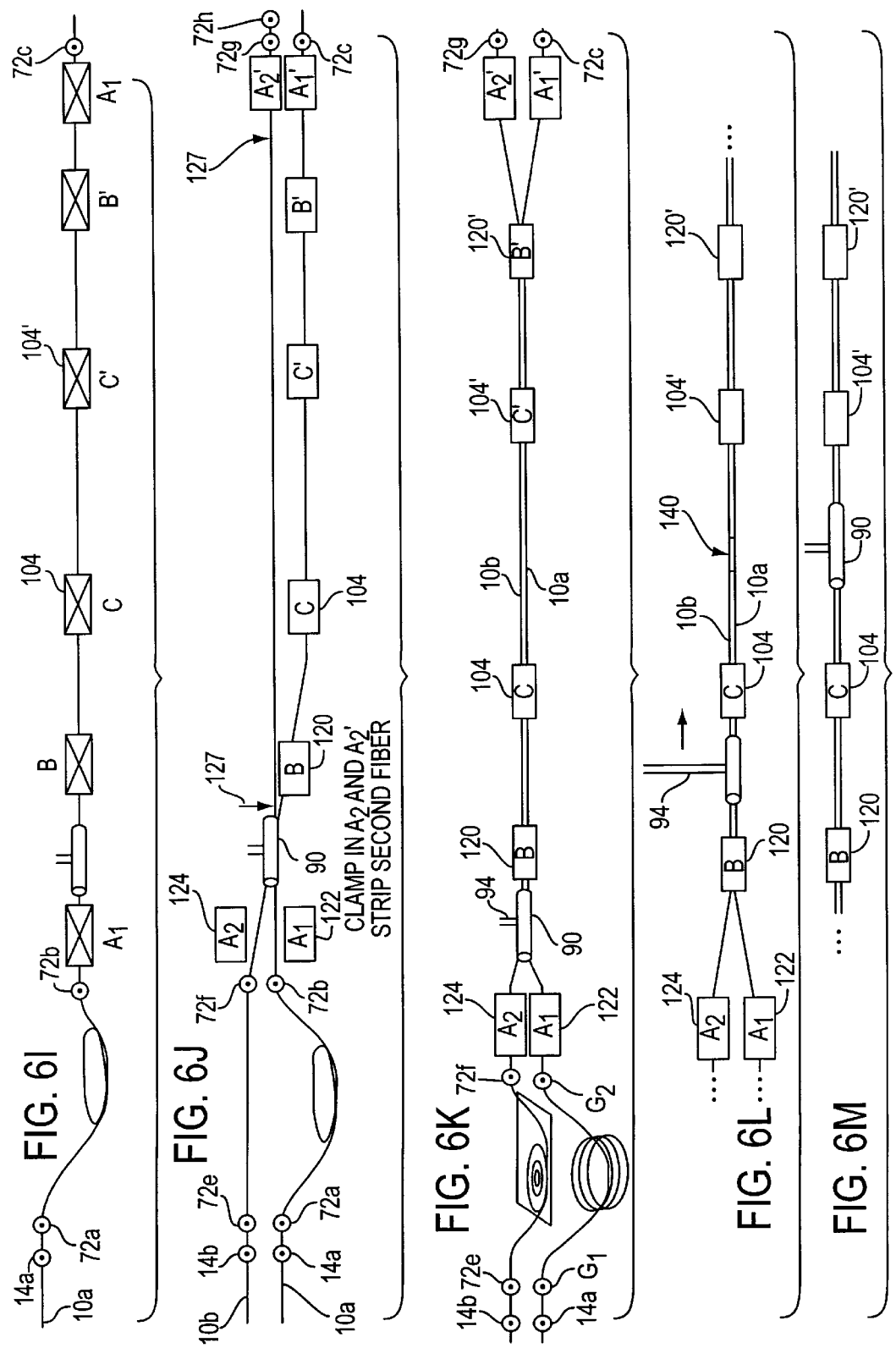

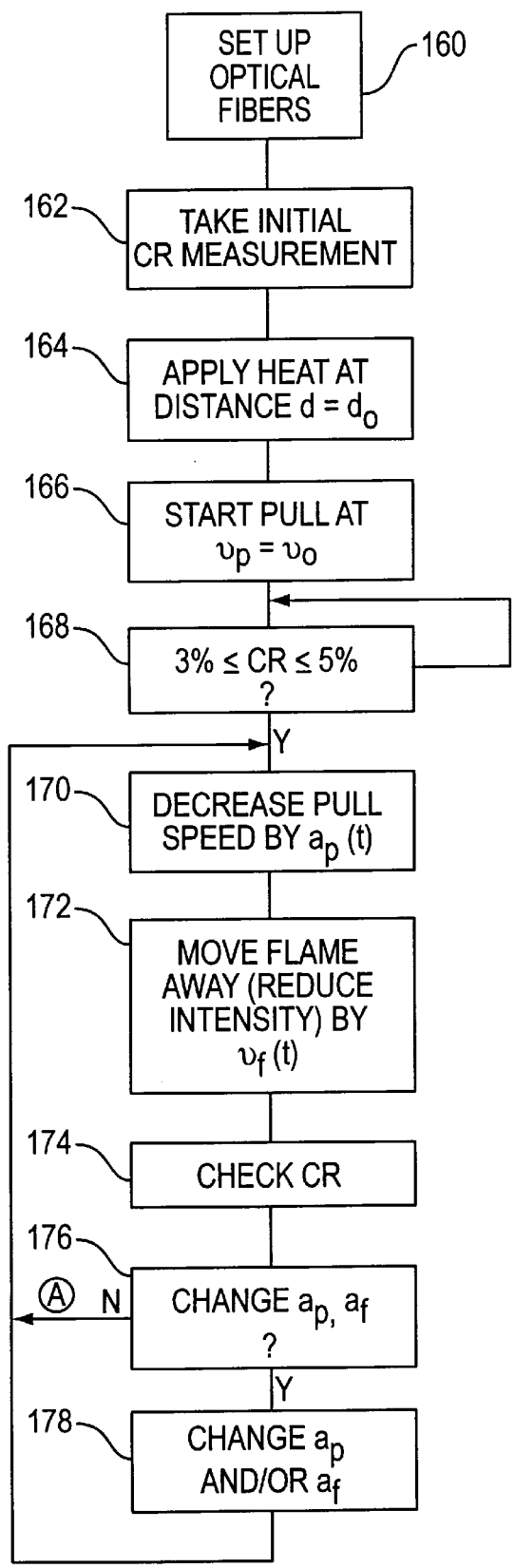

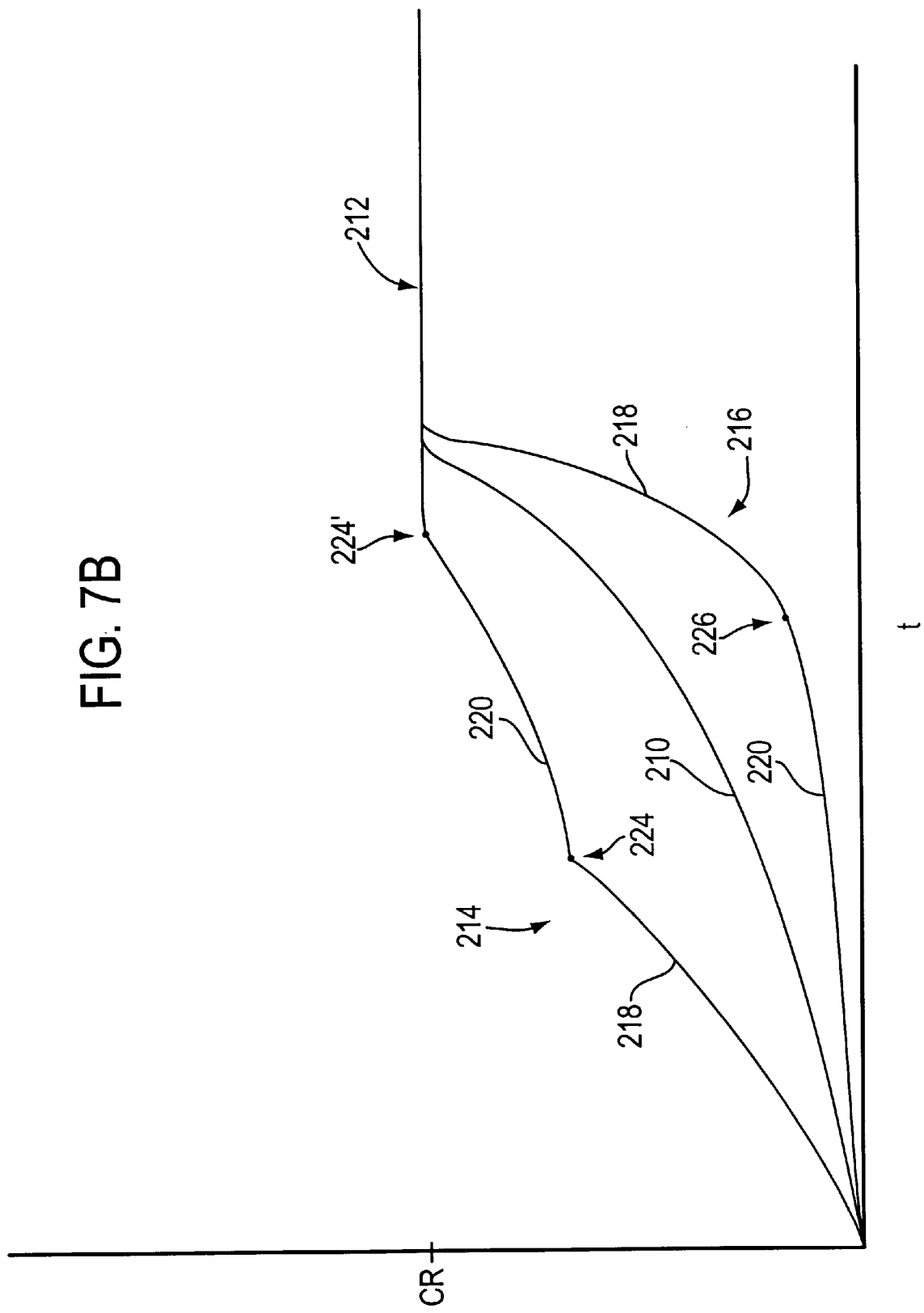

ARRANGEMENT FOR AUTOMATED
FABRICATION OF FIBER OPTIC DEVICES

This application is a division of application Ser. No. 08/763,122 filed Dec. 10, 1996.

TECHNICAL FIELD

The present invention relates to manufacturing techniques for making fiber optic devices from optical fibers, specifically to the fabrication of fiber optic couplers.

BACKGROUND ART

Fiber optic couplers are used as optical beam splitters between two or more fibers. Fused biconical tapered couplers are formed generally by placing two bare single mode fibers in contact with each other, adding tension to the fibers, and heating the fibers using a heat source, for example a flame. As the fibers soften, they fuse together to form the fused biconical tapered coupler.

The conventional manufacture of fiber optic devices such as the fused biconical tapered coupler suffer from the fundamental problem that manual handling by technicians or operators introduces variations to the manufacturing process. Depending on the fiber optic device being formed, a considerable amount of error may be introduced by the handling of an optical fiber by an operator or technician. For example, conventional formation of a coupler includes removing of an outer coating from two or more optical fibers and placing the exposed optical fibers in contact with each other. The fibers may be twisted together, depending on the particular technique used to manufacture the coupler. The fibers are then fused together by heat, as the fibers are placed under tension by slowly and carefully pulling them apart at a predetermined rate. Given the delicate nature of optical fibers, the manufacture of optical fiber couplers requires highly skilled and trained technicians.

An additional problem with conventional manufacturing techniques is that the optical characteristics of the fiber optic devices during manufacture are uncontrollable. Skilled technicians with experience from trial and error have been needed to anticipate the optical characteristics of a fiber optic device during manufacture. For example, technicians making fused biconical tapered couplers would recognize that a jump in the detected coupling ratio occurs when a heat source is suddenly removed from the heated optical fibers. Technicians would attempt to anticipate the jump in the detected coupling ratio such that the heat source, when removed, would cause the detected coupling ratio to jump to the desired level. Hence, the yield of the manufacturing process would be unpredictable and entirely dependent on the individual technician's expertise.

U.S. Pat. No. 5,386,490 to Pen et al., incorporated in its entirety herein by reference, discloses a workstation for manufacturing a coupler between at least two optical fibers. A technician threads an optical fiber from an optical fiber spool into the clamping assembly. The technician is also needed to terminate the bare fiber into a bare fiber adaptor, used to hold the end of the optical fiber relative to a photodiode. Hence, the arrangement disclosed by Pen et al. still requires an operator to thread the optical fiber from a spool to the clamping assembly and mount the end of the optical fiber into a termination point. Further, operator intervention is still required for subsequent manufacturing operations, including hermetic sealing, testing, and packaging. Consequently, variations due to operator handling still exist.

Hence, the conventional manufacturing process suffers an inherent degree of variability due to manual handling by the skilled technicians. In addition, the necessity of skilled technicians greatly increases the manufacturing costs for the fiber optic devices. Finally, use of skilled technicians limits the production capacity, since technicians are subject to fatigue.

DISCLOSURE OF THE INVENTION

There is a need for an arrangement for the automated fabrication of fiber optic devices without the necessity of intervention or supervision by a human operator or technician.

There is also a need for an arrangement for automated fabrication of fiber optic devices, where the handling of optical fibers during manufacture is precisely controlled.

There is also a need for an arrangement for the automated fabrication of a fiber optic device, where an optical fiber can be automatically removed from a spool, threaded, and clamped into a fabrication assembly without human intervention.

There is also a need for an arrangement for an automated testing system, where a manufactured fiber optic device can be automatically tested without human intervention, and while maintaining the fiber optic ends at precise, controlled positions.

There is also a need for an arrangement for automated fabrication of a fiber optic device, where the sequence of drawing optical fiber from a spool, manufacturing the fiber optic device, testing the fiber optic device, and packaging the fiber optic device can be performed without any human intervention.

There is also a need for an arrangement for automatically forming a fiber optic device, where the fiber optic device can be hermetically sealed as part of the fabrication process without any human intervention or supervision.

There also exists a need for a method for automated fabrication of a fiber optic device, where a complete manufacturing process including pulling fiber from a spool, stripping the optical fiber, forming the fiber optic device, hermetically sealing the fiber optic device, testing and packaging the completed device for shipping, can be performed without any operator intervention.

These and other means are attained by the present invention, where control systems operate and manage the movement of an optical fiber using a combination of clamps securing the optical fiber, and movable gripping devices that transport the optical fibers during the fabrication process.

According to one aspect of the present invention, a system for automated fabrication of a fiber optic device includes an interface enclosing an environment substantially adapted for manufacture of the fiber optic device. The interface includes at least one stationary gripping device used to secure an end of a first optical fiber. The first optical fiber may be supplied from a spool positioned outside the manufacturing environment. The system also includes first and second stages within the manufacturing environment, each selectively movable along a first axis and comprising at least one clamp mounted to the corresponding stage for securing an exposed portion of the first optical fiber. A heat source is selectively positioned between the stages for applying heat to the first optical fiber at a selected intensity. A plurality of movable gripping devices are positioned within the environment and configured to successively transport the end of the first optical fiber from the stationary gripping device to a prescribed position, and to position the optical fiber for securing by the clamps. At least one detector is used for detecting an optical characteristic of the first optical fiber by measuring optical energy output at the end of the first optical fiber at the prescribed position. The system also includes a controller for controlling the movement of the first optical fiber by the movable gripping devices. The controller also controls the movement of the first and second stages and the position and intensity of the heat source based on the detected optical characteristics to form the fiber optic device. The movable gripping devices thus transport the optical fiber along prescribed paths while maintaining control of the end of the optical fiber. Hence, the optical fiber may be threaded or clamped to any device or apparatus while maintaining control of the end of the optical fiber. In addition, the movement of the optical fiber by the movable gripping devices from the interface enables the fabrication of the optical fiber in an optimum environment specially suited for fiber optic devices. Hence, the fiber optic device can be manufactured and tested under a carefully controlled system, minimizing the process variations that might occur in manufacturing. Moreover, operator intervention is minimized, enabling production capacity to be maximized.

Another aspect of the present invention provides a method of automating fabrication of a fiber optic device. The method comprises securing an end of a first optical fiber into a stationary gripping device, and transferring the end of the first optical fiber to one of a plurality of movable gripping devices. The end of the first optical fiber is moved along a prescribed path using at least the one movable gripping device, where the prescribed path coincides with positions of at least one device to be threaded by the first optical fiber and primary clamps mounted on first and second stages, respectively. The first optical fiber is secured to the two primary clamps, and heat is applied on the first optical fiber between the two primary clamps with a heat source. The stages are selectively moved along an optical fiber axis to pull the heated first optical fiber at a pulling velocity, and an optical characteristic of the first optical fiber is detected at the end of the first optical fiber. The incident heat and the pulling velocity are controlled based on a change in the detected optical characteristic in order to form the fiber optic device. The fiber optic device is hermetically sealed while maintaining a prescribed position of the end of the fiber optic device, and the fiber optic device is secured to a transport device relative to the end of the first optical fiber and a cut end of the first optical fiber. The first fiber optic device is then moved from the primary clamps and the movable gripping devices while maintaining a prescribed position of the end and the cut end of the fiber optic device relative to the transport device.

The dynamic control of the incident heat and the pulling velocity based on a change in the detected optical characteristic enables the fiber optic device to be formed in a controlled manner according to predetermined specifications. In addition, the formed fiber optic device is hermetically sealed while maintaining the end of the fiber optic device in a prescribed position to ensure that the fiber optic device has sufficient structural and hermetic protection before being moved from the manufacturing area. Finally, use of the transport device enables the fiber optic device to be moved for subsequent treatment while maintaining the ends of the fiber optic device at precisely defined positions relative to the transport device. Hence, maintaining the precise positions of the ends of the fiber optic device during transport enables the fiber optic device to undergo subsequent processing during production without introducing any variations or errors. Consequently, the repeatability of the production system is optimized, resulting in a minimal number of failure rates or deviations from prescribed specifications.

Additional objects, advantages and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIG. 3 is a diagram showing in detail the left stage and clamp assembly of FIG. 2.

FIG. 4 is a diagram showing a perspective view of the primary clamp of FIG. 3.

FIGS. 5A and 5B are top and cross-sectional views of the base portion of the primary clamp of FIG. 4, respectively.

FIGS. 6A–6M summarize a method of moving the optical fibers into position during fabrication of a fiber optic coupler according to an embodiment of the present invention.

FIGS. 7A and 7B are diagrams illustrating a method of forming a fiber optic coupler by selectively changing the flame intensity and pull speed based on detected coupling ratios according to an embodiment of the present invention.

BEST MODE FOR CARRYING OUT THE INVENTION

Figure 1:
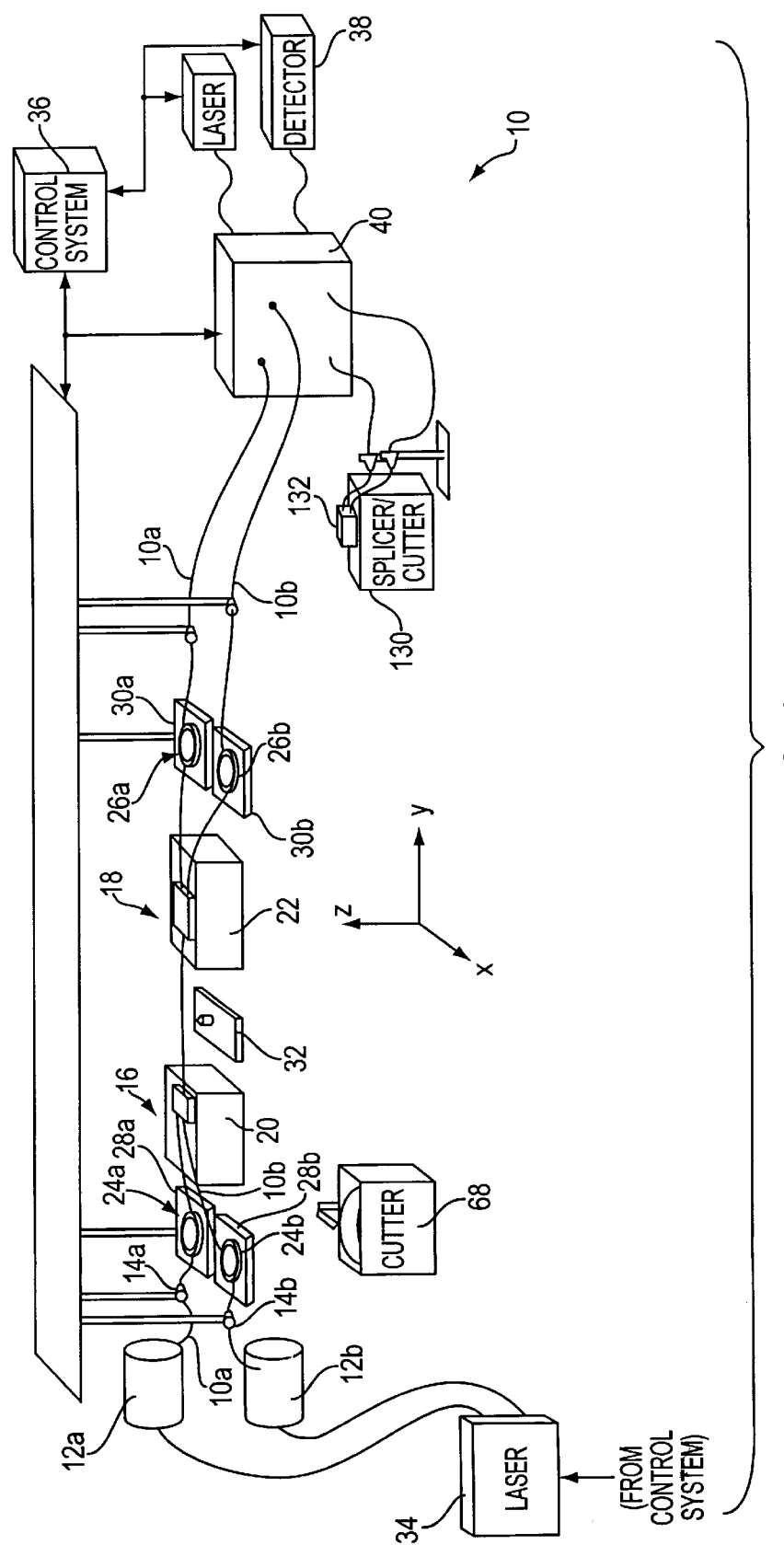
FIG. 1 is a diagram illustrating an overall system for automated fabrication of a fiber optic device according to an embodiment of the present invention.

FIG. 1 is a diagram illustrating an overall system for automated fabrication of a fiber optic device according to an embodiment of the present invention. The system 10 enables the automated fabrication of fiber optic devices, for example optical attenuators, fiber optic couplers, etc., without operator intervention. The method of the automatic fabrication of a fiber optic device may be summarized as follows.

During fabrication of a fiber optic device, lengths of optical fiber are removed from a device carrying a length of optical fiber, for example an optical fiber spool 12. The optical fiber is removed from the spool 12 in a manner that prevents twisting of the optical fiber in order to prevent any stresses from being induced on polarization-sensitive fibers, for example birefringent fibers. When the optical fiber spool 12 is initially set up for providing optical fiber, the end of the optical fiber on the spool 12 is secured into a stationary gripping device 14. As described below, the gripping device has at least an open and closed position, where the optical fiber may move freely when the gripping device 14 is in an open position, and where the fiber is securely positioned when the gripping device 14 is in a closed position.

Once the optical fiber from the spool 12 is secured into the stationary gripping device, the system 10 is able to maintain control over the end of the optical fiber and the path of the optical fiber. Specifically, the end of the optical fiber is controlled at all times to be at a specified position in order to maintain an accurate relationship between the optical fiber used during fabrication and the associated devices operating on the optical fiber. For example, control of the end of the optical fiber enables the system to automatically clamp the end of the optical fiber and perform automated fusion splicing, automated termination of the optical fiber to a ferrule, automated packaging for shipping in a container that secures the end for future use, etc. In addition, the length optical fiber is controlled as it is moved along a prescribed path, enabling the optical fiber to be positioned for clamping and collected for formation of fiber optic leads on each end of a fiber optic device. Hence, the disclosed embodiment provides a completely automated system for the fabrication of fiber optic devices by maintaining at all times precise control over the length of the optical fiber from the spool 12a and the corresponding fiber end.

Once the end of the optical fiber is secured to the stationary gripping device 14a, the optical fiber can be moved along a prescribed path in order to thread additional devices onto the optical fiber, or to position the optical fiber with respect to clamping devices. Once the optical fiber is moved through any devices to be threaded, the optical fiber is moved along the path of clamp assemblies 16 and 18 mounted on movable stages 20 and 22, respectively. As described in detail below, the optical fiber is moved in a manner to provide an optical fiber lead 24 and 26 on each end of the clamp assemblies 16 and 18.

Figure 12:
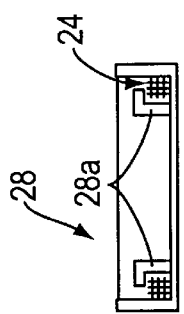
FIG. 12 is a cross-sectional diagram of the optical fiber lead container of FIG. 11.

Once the first optical fiber 10a is clamped for fabrication, the optical fiber 10a may be pretapered by heating the optical fiber using a movable heat source 32 and pulling the heated optical fiber using the movable stages 20 and 22. The optical fiber leads 24 and 26 are placed in a lead container 28 and 30, respectively, for example trays. A cross-section of the lead container is shown in FIG. 12, where members 28a maintain the optical fiber leads 24.

After any necessary pretapering, a second optical fiber 10b is loaded onto a stationary gripping device 14b. The optical fiber 10b is despooled from a second spool 12b, at which point the stationary gripping device 14b secures the end of the second optical fiber 10b. Once the end of the second optical fiber 10b is secured to the stationary gripping device 14b, the optical fiber is moved by movable gripping devices along a prescribed path coinciding with positions of a device to be threaded and the clamp assemblies 16 and 18 supporting the first optical fiber 10a. As described in detail below, the second optical fiber 10b is also moved in a manner to form optical fiber leads 24b and 26b supported by containers 28b and 30b.

Once the first optical fiber 10a and the second optical fiber 10b are secured in the clamp assemblies 16 and 18, the fiber optic device can be manufactured according to predetermined specifications, described below. Once formation of the fiber optic device is completed, the fiber optic device is hermetically sealed while secured in the clamp assemblies 16 and 18. As described below, the clamp assemblies 16 and 18 each include a plurality of clamps that can be successively released and reclamped to enable threaded devices to be moved over the fiber optic device while maintaining the position of the optical fibers relative to clamp assemblies 16 and 18.

During formation of the fiber optic device, laser energy is supplied to the optical fibers 10a and 10b by an external laser source that selectively provides coherent light energy to each of the optical fibers 10a and 10b wound on the respective spools 12a and 12b. The laser 34 is under the control of the control system 36, described below. The formation of the fiber optic device is controlled by detecting changes in an optical characteristic of at least one of the optical fibers 10 using a detector 38. The detector 38 may be directly coupled to one of the optical fibers 10, but preferably is coupled to the optical fibers 10 via a switching assembly 40, described below. The detector 38 will monitor the output power of either of the optical fibers 10a and 10b to determine the coupling ratio. The detector 38 supplies the detected reading to the control system, which controls the movement of the stages 20 and 22 and the intensity of the heat source 32. The control system 36 controls the incident heat and pulling velocity on the optical fibers 10a and 10b between the set of clamps 16 and 18 based on a change in the detected optical characteristic. As described below, the dynamic adjustment of the pulling velocity and the incident heat enable the detected optical characteristic to be controlled such that the desired optical characteristic of the fiber optic device to be formed can be achieved.

Figure 11:
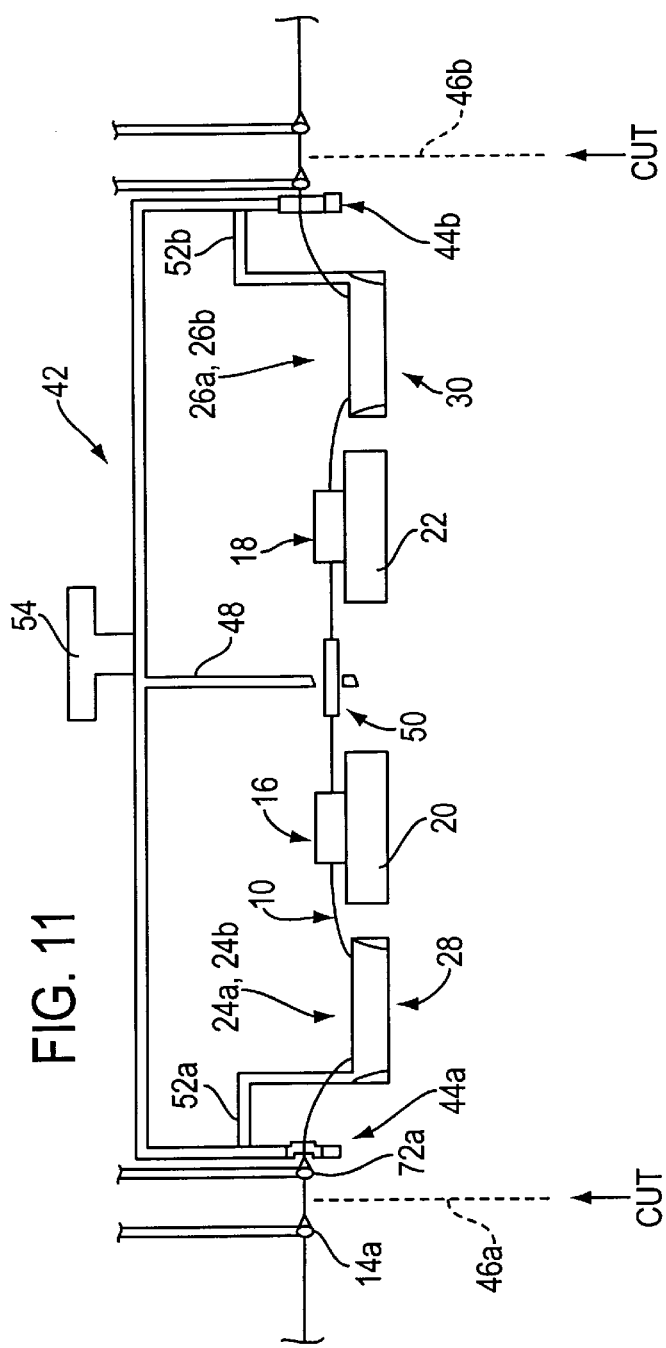
FIG. 11 is a diagram illustrating a transport arm for securing the fiber optic device before transport according to an embodiment of the present invention.

The fiber optic device is then hermetically sealed, after which the fiber optic device is secured for movement using a transport arm 42, shown in FIG. 11. The transport arm 42 has a pair of gripping devices 44 for securing the optical fibers 10. The gripping device 44a secures the optical fibers 10a and 10b between the optical fiber leads 24a and 24b and a movable gripper 72a prior to cutting the optical fiber at a cutting point 46a. The gripping device 44b similarly secures the optical fibers 10 between the leads 26a and 26b and at a prescribed position relative to the end of the optical fiber, preferably coincidental with the cutting point 46b in order to minimize the waste of excess optical fiber. The transport arm 42 also includes a support member 48 for supporting the fiber optic device 50, and container support members 52a and 52b for supporting the lead containers 28 and 30, respectively. Hence, the transport arm 42 supports the fiber optic device 50 and the ends of the fiber optic device at prescribed positions relative to the ends of the fiber optic device using the gripping devices 44a and 44b. Hence, once the optical fibers are cut at the cutting positions 46a and 46b, the fiber optic device 50 can be moved while maintaining the ends of the fiber optic assembly at prescribed positions.

Figure 14A:
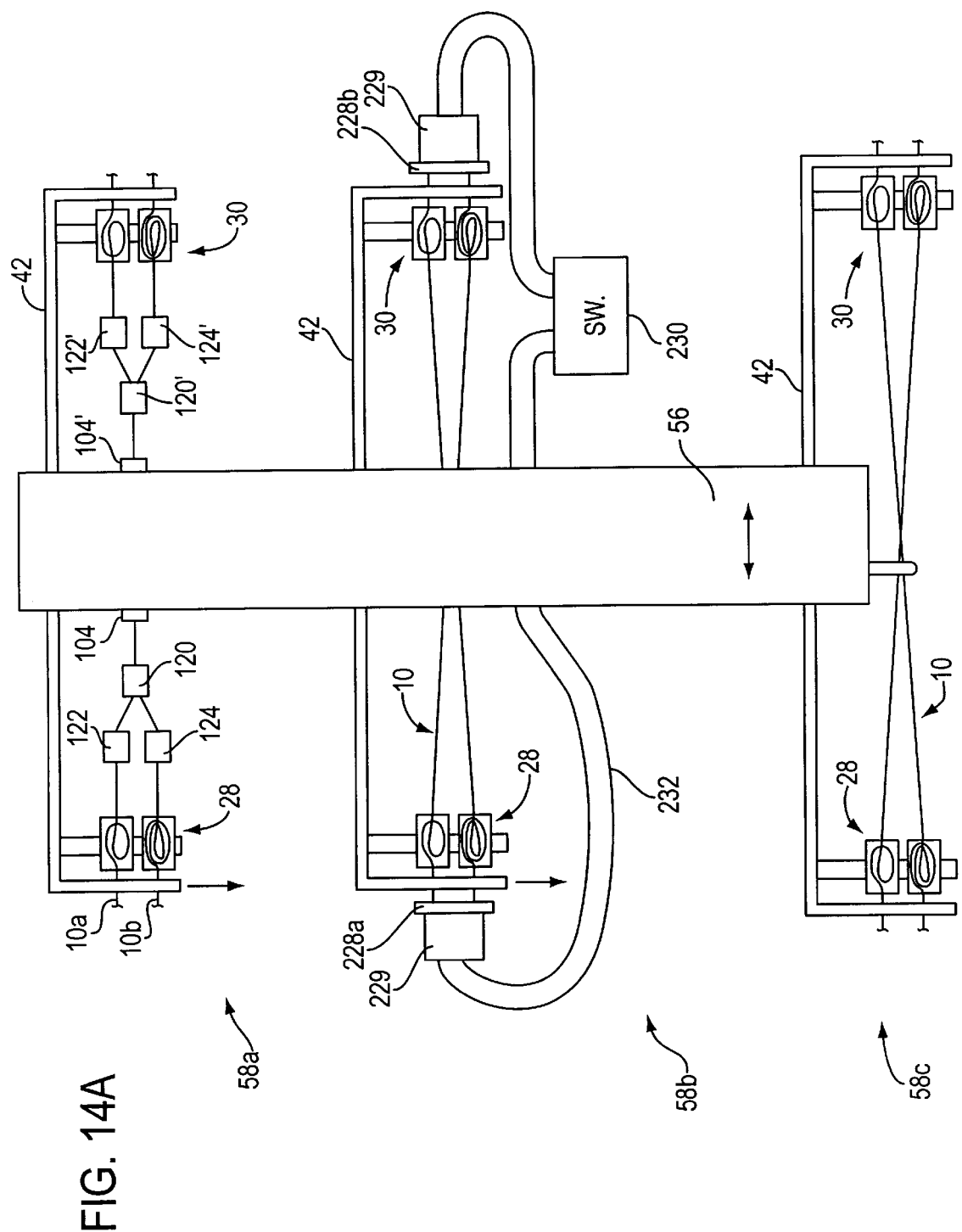
FIGS. 14A and 14B are diagrams summarizing the movement of the transport arm by a conveyor assembly for moving the fiber optic device from a fabrication station to a testing and packaging station.
Figure 14B:
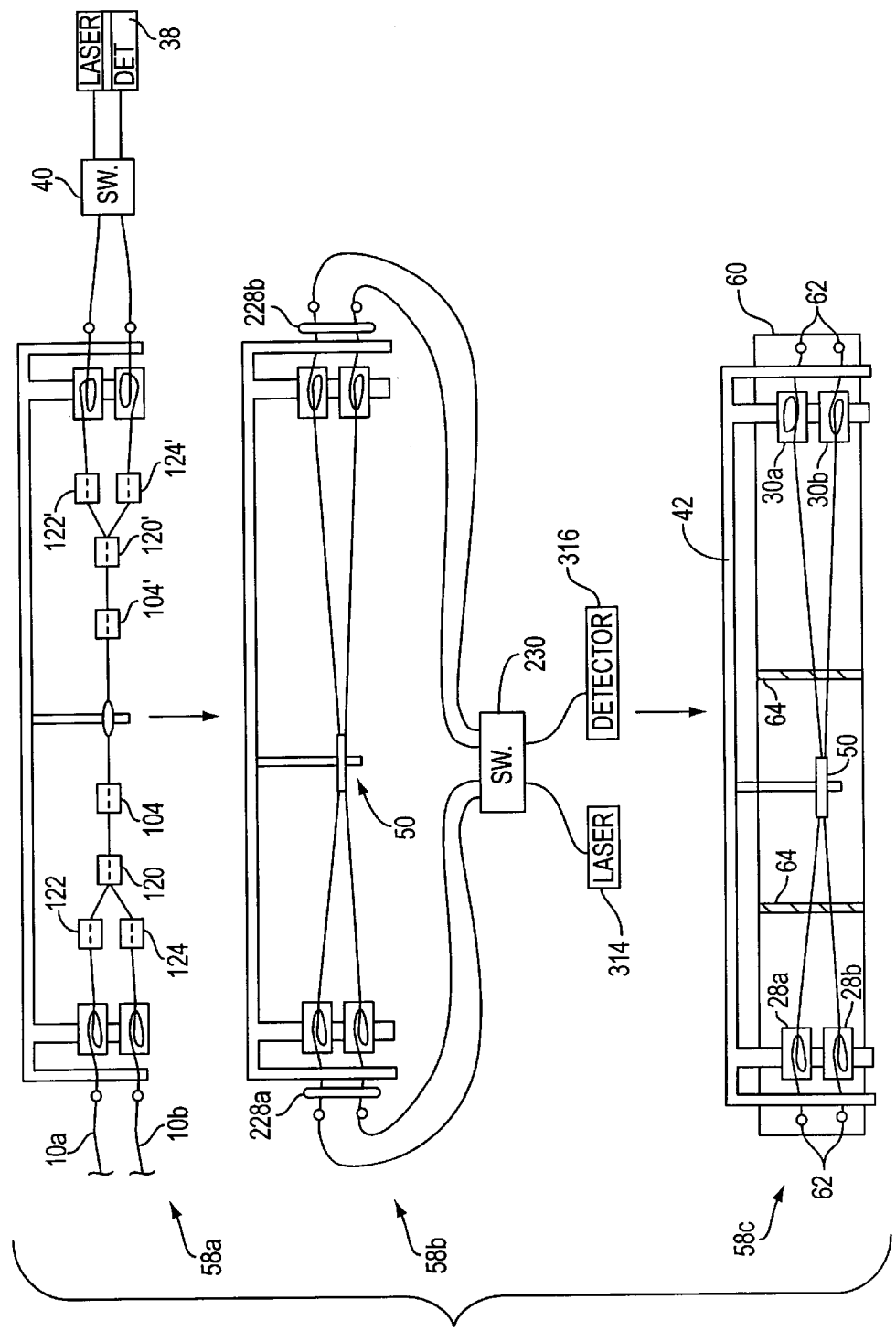

Hence, the entire fiber optic device 50 and the associated leads can be moved while maintaining a precise position of the ends of the fiber optic device 50. The fiber optic device can then be moved for subsequent processing, for example testing and packaging as shown in FIGS. 14A and 14B. The fiber optic device 50 may also be moved for subsequent fabrication, for example by integrating the fiber optic device 50 into other fiber optic devices or assemblies.

As shown in FIG. 11, the transport arm 42 is detachably coupled to a coupling member 54. The coupling member 54 enables the transport arm 42 to be moved by a conveyor assembly 56, shown in FIG. 14A, that moves the transport arm along a first axis to a plurality of stations, for example the manufacturing station 58a as shown in FIG. 1, a testing station 58b, shown in more detail in FIG. 15, and a packaging station 58c for packaging of the fiber optic device for shipment. The conveyor assembly 56 also has translational movement in a direction perpendicular to the movement of the transport arm 42, enabling the optical fiber device 50 to be transported to any location within a manufacturing area. Once the fiber optic device 50 has been moved to a desired station 58, a corresponding set of clamps at the desired station 58 may be used to secure the fiber optic device and the corresponding leads to the corresponding station 58, enabling the transport arm 42 to be released for other use.

If the fiber optic device 50 is transported to a packaging station 58c, shown in FIG. 14b, the transport arm 42 will place the fiber optic device and the corresponding leads in a package 60. During packaging, the ends of the fiber optic device are placed in termination plugs 62 that secure the ends of the fiber optic device. In addition, the package 60 will include lead hooks (not shown) to secure the optical fiber leads 24 and 26. Once the optical fiber leads are secured, the lead containers 28a, 28b, 30a, and 30b can be removed. In addition, the package 62 includes support members 64 for supporting the optical fibers adjacent to the fiber optic device 50. A raised platform within the package 60 can support the fiber optic device 50 itself.

Hence, the disclosed embodiment provides an arrangement where a fiber optic device 50 can be manufactured, tested, and packaged while maintaining precise positioning of the ends of the optical fibers forming the end of the manufactured fiber optic device.

Figure 2:
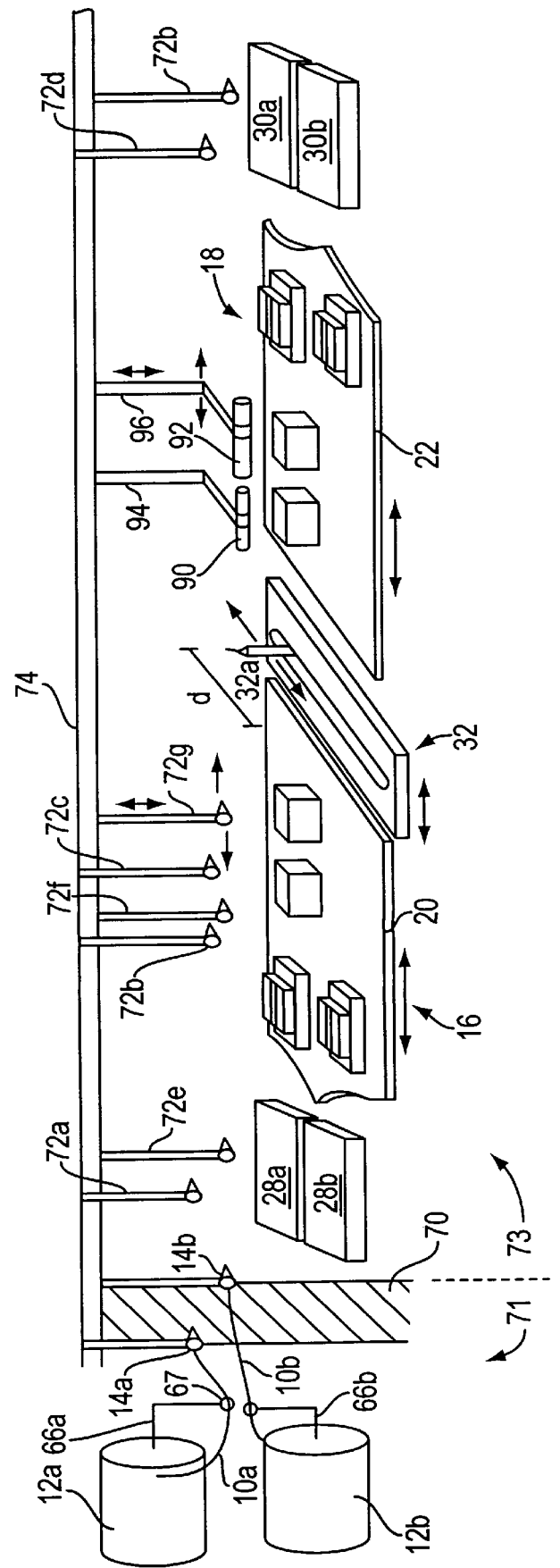
FIG. 2 is a diagram illustrating in more detail the clamping assembly, the movable gripping devices, and the heat source of the embodiment of FIG. 1.

FIG. 2 is a diagram showing in more detail the clamping assemblies 16 and 18, and the movable gripping devices used to move the optical fibers 10 while maintaining a precise control over the end of each of the optical fibers. As shown in FIG. 2, each of the optical fiber spools 12a and 12b have corresponding optical fibers 10a and 10b that are threaded into the stationary gripping devices 14a and 14b using despooling arms 66a and 66b. Each despooling arm 66 is rotatable about the corresponding spool 12. The despooling arm 66 includes an end gripper 67 capable of locating and grasping an end of the optical fiber from the spool 12. Once the despooling arm 66 has located the end of the optical fiber on the spool 12, the end gripper 67 grips the end of the optical fiber, and moves the end of the optical fiber to the corresponding stationary gripping device 14. Once the optical fiber 10 is secured to the corresponding stationary gripping device 14, the end gripper 67 remains in an open position and the despooling arm 66 rotates about the axis of the optical fiber spool 12 to remove optical fiber as needed from the optical fiber spool without adding any twisting or tension to the optical fiber 10.

If desired, the end clamp 67 at the end of the despooling arm 66 may be substituted with a ring that merely guides the optical fiber off the optical fiber spool. In this arrangement, a technician would be needed only to initially thread the optical fiber 10 from the spool through the loop of the despooling arm 66 to the stationary gripping device 14. Once the stationary gripping device 14 secures the end of the optical fiber 10, the automated process can take over to form the fiber optic device. If desired, the end of the optical fiber may also be cleaved by a cutter 68, shown in FIG. 1, to provide a clean cut at the end of the optical fiber after the initial threading to the stationary gripper 14.

As shown in FIG. 2, the system includes an interface 70 that encloses an environment substantially adapted for manufacture of the fiber optic device. The optical fiber spools 12 are positioned in one room, for example a storage room 71, and the stationary gripping devices 14a and 14b are embedded within the interface 70. Hence, once the optical fibers pass through the stationary gripping devices 14, the optical fibers enter an enclosed environment 73, for example a clean room substantially free of dust particles and having a positive pressure of substantially oxygen-free atmosphere composed of an inert gas. Hence, the fiber optic device can be manufactured in a controlled environment that does not adversely react with the optical fibers before hermetic sealing.

Once the end of each optical fiber 10 is secured to the corresponding stationary gripping device 14, the corresponding end of the optical fiber 10 is transferred to one of a plurality of movable gripping devices 72. As shown in FIG. 2, the arrangement of movable gripping devices 72 includes one set of four gripping devices 72a, 72b, 72c, and 72d for moving the first optical fiber 10a along a prescribed path, and a second set of movable gripping devices 72e, 72f, 72g, and 72h for moving the end of the second optical fiber 10b along a prescribed path. As shown in FIG. 2, each of the movable gripping devices 72 are movable along a track 74. If desired, the movable gripping devices may also be movable in a direction perpendicular to the track 74, i.e., in both the x and y directions. In addition, each movable gripping device 72 is independently movable in the vertical (z axis) direction under control by the control system 36.

Figure 13:
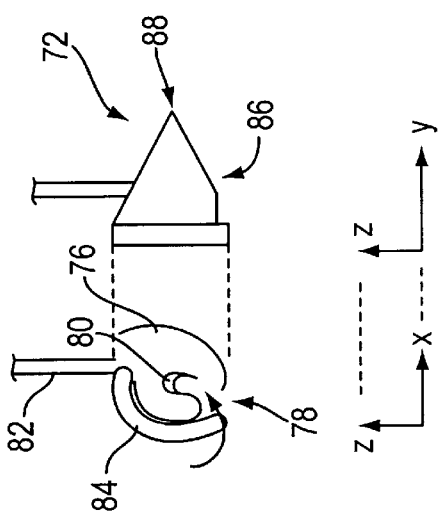
FIG. 13 is a front and side view of one of the gripping devices of FIGS. 1 and 2 adapted to release the optical fiber.

Each movable gripping device 72 is independently controllable to grip and release the optical fiber. FIG. 13 shows in detail a front and side view of the movable gripping device 72. The movable gripping device 72 includes a body 76 having a fiber channel 78 and an elastic end 80. A gripper support arm 82 supports the movable gripping device 72 on the track 74. The gripping device 72 also includes a closing arm 84 rotatably coupled to the body 76 along the y axis. As shown in the righthand portion of FIG. 13, the gripping device 72 also includes a guiding cone 86 having a fiber aperture 88 for the optical fiber. Hence, an optical fiber is secured to the movable gripping device 72 by inserting the optical fiber into the fiber channel 78, and closing the closing arm on the optical fiber, at which point the optical fiber is secured against the elastic end 80. At the same time, the guiding cone 86 guides the end of the optical fiber to the fiber aperture 88. Hence, the movable gripping devices 78 can successively transport the optical fiber while maintaining the end of the optical fiber by handing off the optical fiber to an adjacent movable gripping device. Moreover, each movable gripping device 78 has an input shape complementary to the guiding cone 86, enabling the optical fiber to be automatically centered each time two adjacent gripping devices 72 are engaged to hand off the optical fiber.

Referring to FIG. 2, the first set of movable gripping devices 72a, 72b, 72c and 72d successively hand off the end of the first optical fiber 10a along a prescribed path to position the optical fiber 10a coincident with the clamp assembly 16. The movable gripping devices are also configured to thread the optical fiber 10a through devices to be threaded by the optical fibers 10a and 10b, for example an inner tube 90 and outer tube 92, supported by tube support members 94 and 96, respectively, to be used during hermetic sealing of the fiber optic device. The tube support members 94 and 96 move along the track 74 along the optical fiber axis, i.e., in the y direction. The tube support members 94 and 96 also move in the vertical direction (i.e., z axis).

Each of the clamp assemblies 16 and 18 include a plurality of clamps that enable the optical fibers to be stripped and threaded with the inner tube 90 and the outer tube 92 without losing the position of the optical fiber relative to the work region between the clamp assemblies 16 and 18. The work region includes the movable heat source 32 that is movable in the x and y direction. According to the disclosed embodiment, a flame source 32a having a separate oxygen supply for operation in the oxygen-free atmosphere is controlled by the control system 36 to have a selectable distance (d) from the optical fibers when secured to the clamp assemblies 16 and 18. Alternative heat sources may be used, for example a laser heat source, or an electric (thermal) heat source.

As shown in FIG. 2, the tube support members 94 and 96 are supported on the track 74 along a different path than the tracks used by the movable gripping devices 72. Hence, the movable gripping devices and the tube support members 94 and 96 can be moved between each other. For example, the movable gripping devices 72c and 72g can be moved to the right to a position between the tube support member 96 and the movable gripping device 72d without interference.

FIG. 3 is a diagram showing in detail the left stage 20 and the clamp assembly 16 of FIG. 2. The movable stage 20 is supported by a surface 98 having a plurality of holes 100 for imparting a layer of pressurized gas between the stage 20 and the surface 98. Hence, the stage 20 is able to move along a substantially friction-free surface 98 under the control of an actuator 102. The actuator 102, controlled by the control system 36 of FIG. 1, includes a stepper motor providing high resolution in the translational movement of the stage 20 in the y direction, (i.e., along the optical fiber axis).

The clamp assembly 16 includes a primary clamp 104 that secures an exposed portion of the optical fibers 10a and 10b for manufacturing within the working region between the two stages 20 and 22. The primary clamp 104 includes a base 104a mounted to the stage 20, and a cover 104b that engages the base 104a.

FIG. 4 is a diagram showing a perspective view of the primary clamp 104. FIGS. 5a and 5b are top and side views of the base 104a as shown in FIG. 4. As shown in FIG. 4, the base 104a includes a slot 106 having a width corresponding to the diameter of a bare optical fiber, and a depth corresponding to 1½ times the diameter of an exposed optical fiber. Hence, the slot 106 is adapted to accommodate two optical fibers, where the second exposed optical fiber sits on top of the first optical fiber and is seated halfway within the slot 106. The first optical fiber inserted into the slot 106 is secured by a first vacuum region generated by a first series of vacuum holes 108 located at the base of the slot 106. The base 104a also includes guiding surfaces 110 for guiding an optical fiber into the slot 106. The guiding surfaces 110 also include a second series of vacuum holes 112 for generating a second vacuum region for securing the corresponding surface 110a of the clamp cover 104b to the base 104a.

Hence, an exposed optical fiber is secured in the clamp 104 by placing the optical fiber within the vicinity of the guiding surfaces 110. As the optical fiber is lowered into position of the slot 106, the first series of vacuum holes 108 generate a first vacuum region that secures the first optical fiber within the slot 106. A second optical fiber can then be added on top of the first optical fiber within the slot 106. After the first and second optical fibers have been inserted into the slot 106, the cover 104b is engaged with the base 104a. The cover 104b engages the base 104a using a support arm 104c fixed to the cover 104b. The cover 104b has a groove 114 corresponding to the second optical fiber in the slot 106, enabling the first and second optical fibers to be secured within the clamp 104 upon engagement of the cover 104b with the base 104a. As recognized in the art, the groove 114 may be substituted with an extension (not shown) that extends into the slot 106 in order to secure a single exposed optical fiber within the primary clamp 104 upon engagement of the cover 104b with the base 104a. Hence, different covers 104b may be used, depending on whether one or two optical fibers are to be secured within the clamp 104.

As shown in FIG. 3, the clamp assembly 16 includes clamp 120 and clamps 122 and 124. Clamp 120 is similar in structure to the clamp 104, and includes a base 120a and a cover 120b for securing an exposed optical fiber. The cover 120b includes a support member 120c for engaging and disengaging the cover 120b with the base 120a. The base 120a is movably coupled to the stage 20 via an arm 120d enabling the clamp 120 to move vertically with respect to the stage 20 (i.e., in the z axis).

As shown in FIG. 3, each optical fiber 10 includes a covered portion 126 and an exposed portion 128 defined by an optical fiber coating edge 127. The clamps 104 and 120 secure the optical fiber at the exposed portions 128, whereas the clamps 122 and 124 secure the optical fibers 10a and 10b, respectively, at the covered portions 126. Each of the clamps 122 and 124 are independently movable in the y and z axes, and have removable covers.

As described below, the clamps 120, 122, and 124 are independently movable relative to the stage 20 in order to enable the optical fibers 10a and 10b to be appropriately threaded with devices during manufacturing of the fiber optic device, described below. For example, if the tube 90 of FIG. 2 needs to be threaded to a working area between the stages, the clamps 104 and 120 can be successively released and reclamped to move the tube 90 while maintaining the secured position of the optical fibers 10a and 10b within the working region between the two stages 20 and 22.

Additional details regarding alternative clamping devices may be found in U.S. Pat. No. 5,395,101 to Takimoto et al., the disclosure of which is incorporated in its entirety herein by reference.

Figure 6E:
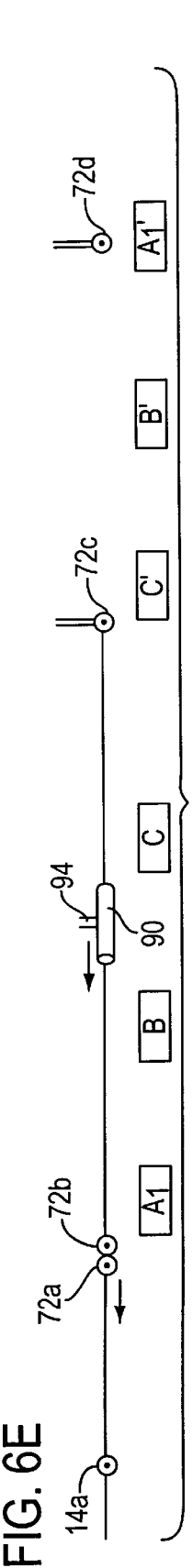

FIGS. 6A–6M summarize the sequence of forming a fiber optic device using the clamp assembly 16 and 18 and the movable gripping devices 72. The following sequence illustrates one particular example of how the arrangement of FIG. 2 can be used to automate the manufacture of a fiber optic device while maintaining the path of the optical fiber and the position of the end of the optical fiber. The process begins in FIG. 6A, where the stationary gripping device 14a hands off the optical fiber 10a to the first movable gripping device 72a. As shown in FIG. 6A, the tube 90 supported by the tube support member 94 is positioned between the movable gripping devices 72b and 72c. After the end of the optical fiber 10a has been handed off to the movable gripping device 72a, the movable gripping device 72a moves the optical fiber 10a toward the adjacent movable gripping device 72b along a prescribed path. Before movement of the movable gripping device 72a, the stationary gripping device 14 opens to a disengaged position, enabling the optical fiber 10*a* to move freely through the stationary gripping device 14*a*.

As shown in FIG. 6B, the movable gripping device 72*a* moves the optical fiber 10*a* to the movable gripping device 72*b*, at which point the movable gripping device 72*a* hands off the end of the optical fiber to the adjacent movable gripping device 72*b* for further transport. Once the movable gripping device 72*b* has received the end of the optical fiber from the device 72*a*, the gripping device 72*b* secures the end of the optical fiber 10*a* for movement. The gripping device 72*a* releases the optical fiber 10*a* to enable the optical fiber to move freely through the gripping device 72*a*. The gripping device 72*b* then moves in the right direction (i.e., along the y axis), while the gripping device 72*a* moves in the rightward direction at a distance behind the gripping device 72*b* corresponding to the length of the tube 90, as shown in FIG. 6C. Once the gripping device 72*b* reaches the edge of the tube 90, the gripping device 72*a* closes on the optical fiber 10*a*. The gripping device 72*b* then opens, enabling the gripping device 72*a* to push the optical fiber 10*a* through the tube 90.

Once the gripping device 72*a* reaches the adjacent gripping device 72*b*, the gripping device 72*c*, under the control of the control system 36, captures and secures the end of the optical fiber 10*a* as the optical fiber 10*a* passes through the tube 90. Once the gripping device 72*c* secures the end of the optical fiber 10*a*, shown in FIG. 6D, the gripping devices 72*a* and 72*b* release the optical fiber 10*a*.

As shown in FIG. 6E, the gripping device 72*c* then moves the optical fiber 10*a* along a prescribed path corresponding to the second clamp assembly 18 while maintaining the end of the optical fiber 10*a*. At the same time, the threaded tube 90 is moved by the tube support member 94 to a position between the clamps 120 and 122 of the first clamp assembly 16. The gripping device 72*c* moves the optical fiber to the gripping device. 72*d*, and hands off the optical fiber 10*a* to the gripping device 72*d*. The gripping device 72*d* secures the end of the optical fiber 10*a*, ensuring that the end of the optical fiber 10*a* is controlled at all times. Alternately, the gripping device 72*d* may pass the end of the optical fiber to a splicer 130, shown in FIG. 1. The splicer 130 has a splicer clamp 132 that is adapted to receive the end of the optical fiber from the gripping device 72*d*, clamp the end of the optical fiber, and splice the end of the optical fiber 10*a* to a lead of the switching assembly 40.

Once the optical fiber 10*a* is secured by the gripping device 72*d*, the gripping devices 72*c* and 72*d* cooperate to form the optical fiber lead 26 to the right of the clamp assembly 18, as shown in FIG. 1. Once the gripping devices 72*c* and 72*d* have pulled a sufficient length to form the optical fiber lead 26*a*, for example 1, 5 or 10 meters, the gripping devices 72*a* and 72*b* cooperate to form the optical fiber lead 24*a*, shown in FIG. 6F.

Figure 6F:
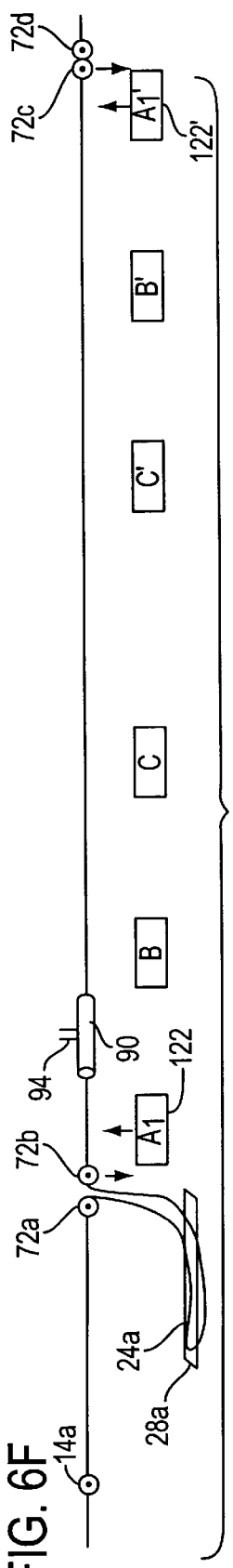
Figure 6G:
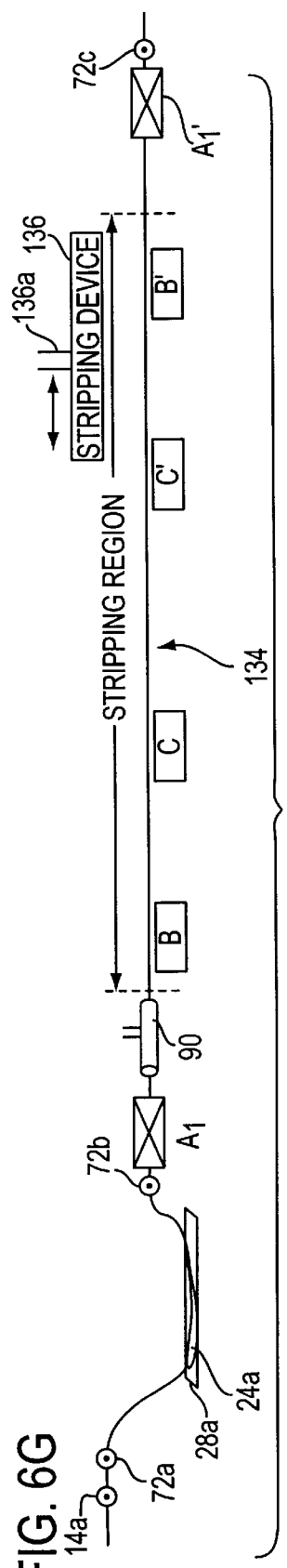
Figure 6H:
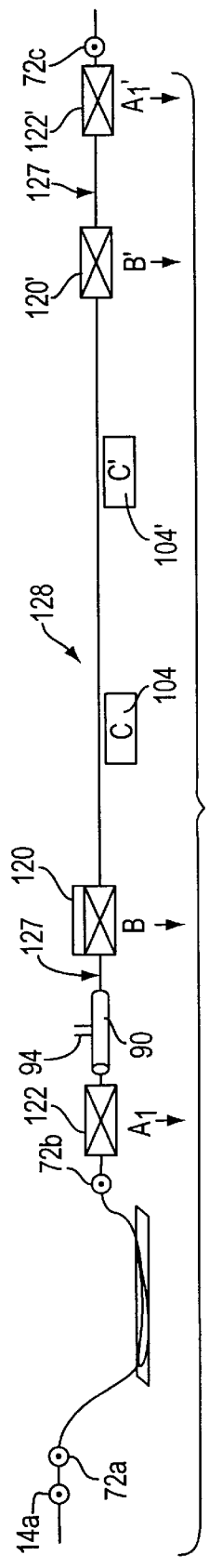

Once the leads 26*a* and 24*a* have been formed in FIG. 6F, the clamps 122 and 122' of the clamping assemblies 16 and 18, respectively, are moved vertically with respect to the respective stages 20 and 22 to clamp onto the covered portion of the optical fiber 10*a*. Once the covered optical fiber 10*a* is clamped by the clamps 122 and 122', as shown in FIG. 6G, a stripping region 134 between the clamps 122 and 122' can be stripped by a stripping device 136 having a support member 136*a* coupled to the track 74 for movement along the optical fiber 10*a*. The stripping device 136 may strip the coating from the optical fiber using chemical etch techniques or heating techniques. After stripping the coating from the optical fiber in FIG. 6G, the optical fiber has an exposed portion 128 bounded by the coating edges 127, as shown in FIG. 6H. The exposed portions of the optical fibers are then clamped by clamps 120 and 120', which are raised by the corresponding arms 120*d* to secure the exposed optical fiber. Once the exposed optical fiber is secured by the clamps 120 and 120' of the respective clamp assemblies 16 and 18, the clamps 122, 120, 120', and 122' and the tube 90 are lowered simultaneously to place the optical fiber 10*a* into the clamps 104 and 104' that are fixed to the stages 20 and 22, respectively. Once the optical fiber is secured in the clamps 104 and 104' as shown in FIG. 6I, operations such as pretapering may be performed on the optical fiber 10*a*. In addition, if the fiber optic device to be formed is an optical attenuator consisting of a single optical fiber, the optical fiber attenuator would be formed at this time.

If a second optical fiber is to be threaded, for example for the formation of a fused biconical tapered coupler, the second optical fiber 10*b* would be threaded through the tube 90 in a manner described with respect to FIGS. 6A–6F, resulting in the arrangement of FIG. 6J. During threading of the second optical fiber 10*b*, clamps 120 and 104 secure the optical fiber 10*a*, while the clamp 122 releases the optical fiber 10*a*. The clamp 120*a* is then slightly accommodated to enable the tube 90 to be partially moved to accommodate the threading of the second optical fiber 10*b*. After the second optical fiber 10*b* has been threaded as shown in FIG. 6J, the clamps 124 and 124' clamp the covered portion of the optical fiber 10*b* to perform stripping of the optical fiber 10*b*. After stripping has been performed, the optical fibers 10*a* and 10*b* are clamped as shown in FIG. 6K, at which point fusion of the optical fibers 10*a* and 10*b* is performed to form a fiber optic device 140, described below. After formation of the fiber optic device as shown in FIG. 6L, the optical fibers 10*a* and 10*b* are unclamped from the clamp 104 to enable the tube 90 to be moved by the tube support member 94 to cover the fiber optic device 140. During the time that the clamps 104 and 104' are in an unclamped position, the clamps 120 and 120' remain clamped to maintain the accurate position of the optical fibers. Once the tube 90 is moved to a position enclosing the fiber optic device 140, the clamps 104 and 104' can be reclamped in order to perform the subsequent steps of hermetically sealing the fiber optic device 140, described below.

FIGS. 7A and 7B are diagrams summarizing the method of forming a fiber optic device by dynamically adjusting the pulling speed and heat intensity to control the detected coupling ratio. According to the disclosed embodiment, the pulling speed and the heat intensity are dynamically controlled by the control system 36 in accordance with detected coupling ratio to control the rate of change in the coupling ratio. Hence, the coupling ratio of a fiber optic device being manufactured can be controlled based on dynamically adjusting the heat intensity and pulling speed. The method begins in step 160 by initially setting up the apparatus as shown in FIG. 1, where optical fibers 10*a* and 10*b* are connected to the clamping assemblies, described above, and the ends of the optical fibers 10*a* and 10*b* are connected to a switching assembly that uses a detector 38 to dynamically monitor the output of the ends of the optical fibers 10*a* and 10*b*. The optical fibers 10*a* and 10*b* are then secured to the clamps, as described above, with sufficient initial tension to straighten the optical fibers to ensure that the optical fibers contact each other within a fusion region. Once the setup is completed according to the arrangement of FIG. 1, an initial measurement is taken by the detector 38 in step 162. The coupler formation process then begins in step 164 by applying heat to the optical fibers 10a and 10b. The heat is applied at a predetermined initial intensity, for example by placing a flame generated by the heat source 32a at a predetermined distance ($d=d_0$) from the optical fibers, for example by placing the tip of the flame directly on the fibers.

Once the optical fibers 10a and 10b have softened, the controller 36 starts pulling the optical fibers in step 166 at an initial velocity of $v_p=v_0$, where $v_0$ equals, for example, 5 mm per minute. The initial distance of the heat source ($d_0$) and the initial pull speed ($v_0$) are maintained until the controller 36 detects in step 168 a substantial change in the detected coupling ratio of between 3% to 5%. The substantial charge in the coupling ratio identifies the transition point at which the optical fibers begin to optically couple the transmitted laser energy.

If the coupling ratio is allowed to increase by maintaining a constant pull velocity and a constant heat intensity, the coupling ratio may continue to increase uncontrollably. It has been discovered that the rate of increase in the coupling ratio increases substantially after the coupling ratio reaches 10%. Hence, the control of the coupling ratio should begin before the coupling ratio reaches 10%.

The control of the coupling ratio begins in step 170 by decreasing the pull speed at a specified deceleration rate $a_p(t)$. The coupling ratio is then controlled in step 172 by moving the heat source 32a away from the optical fibers 10a and 10b at a speed of $v_f(t)$. The initial position of the heat source 32a is necessary to soften the optical fibers sufficient to overcome the surface tension of the optical fibers. Once the optical fibers begin to physically fuse, the incident heat on the optical fibers is reduced by moving the heat source away from the optical fibers. To prevent movement of the heat source 32a from causing a change in the shape of the taper in the coupler, the pull speed is simultaneously reduced such that the ratio between the heat intensity and the pull speed is substantially constant. Hence, reducing the flame reduces the rate of change in the coupling ratio when the pull speed is reduced accordingly. Moreover, a reduction in heat intensity ensures the coupling ratio readings are not distorted.

Hence, by reducing the heat intensity until the point where the optical fibers are soft enough to be pulled, the method of forming the coupler may be precisely controlled.

After the pull speed and the heat intensity have been changed in steps 170 and 172, respectively, the coupling ratio (CR) is checked at selected wavelengths. If desired, the controller 36 may also calculate in step 174 the rate of change in the coupling ratio. After calculating the coupling ratio at the selected wavelengths and the rate of change in the coupling ratio, the controller 36 decides in step 176 whether the heat reduction rate ($a_f$) or the deceleration ($a_p$) of the pull speed needs to be changed in step 178. If no change in the deceleration rate is needed, the controller 36 returns to step 170 to selectively decrease the pull speed and the flame velocity for the next iteration. According to the disclosed embodiment, the decreases in steps 170 and 172 are implemented in one second iterations.

FIG. 7B is a diagram illustrating the change in the coupling ratio, where a coupling ratio curve 210 increases steadily until reaching a desired level 212. As described above, the heat source is preferably gradually reduced before reaching the desired coupling ratio 212 to ensure any sudden changes in the heat intensity do not distort the coupling ratio readings. Hence, the final incremental changes in the coupling ratio along the curve 210 is accomplished by maintaining the heat source at a reduced intensity sufficient to enable the optical fibers to be pulled, steadily decreasing the pull speed ($v_p$) until the desired coupling ratio level 212 is reached, at which point the pull speed ($v_p$) is set to zero and the heat source is removed without causing a change in the coupling ratio.

The disclosed method thus provides full control over the changes in the coupling ratio by dynamically adjusting the heat intensity and the pulling velocity. In addition, once the heat intensity has been reduced by a sufficient amount, i.e., once the flame has been moved far enough away, accurate measurements of the coupling ratio may be obtained, such that the pulling process may be held to precisely at the desired coupling ratio. Hence, the heating and pulling process can be automatically controlled to form a fiber optic device having a precise coupling ratio according to predetermined specifications. Additional details regarding the method of forming a fiber optic device by dynamically changing heat intensity and pull speed based upon the detected optical characteristics can be found in co-pending application Ser. No. 08/718,727, filed Sep. 24, 1996, entitled "Method and Apparatus of Forming a Fiber Optic Coupler By Dynamically Adjusting Pulling Speed and Heat Intensity," (Attorney Docket 2986-002), the disclosure of which is incorporated in its entirety herein by reference.

FIGS. 8A–8G summarize the method of hermetically sealing the fiber optic device 140 according to an embodiment of the present invention.

Figure 8A:
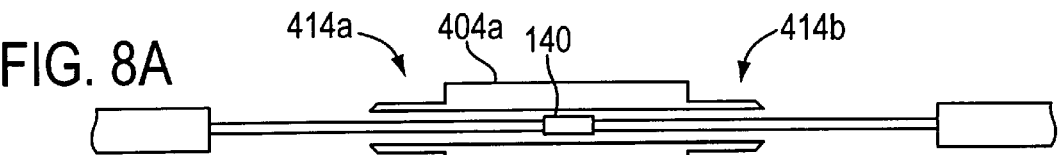
FIGS. 8A–8G illustrate a method of hermetically sealing the fiber optic device according to an embodiment of the present invention.
Figure 8B:
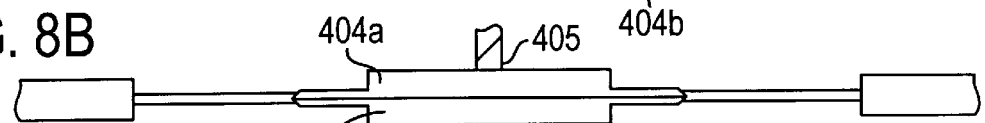
Figure 8C:
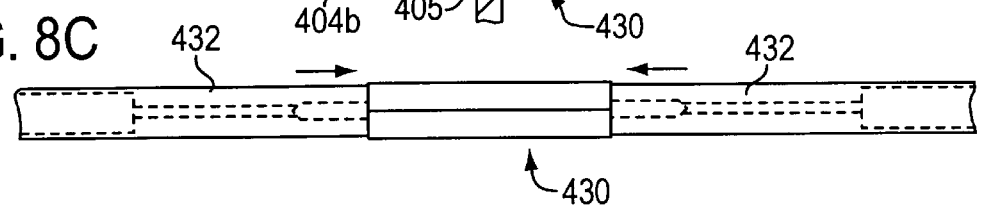

As shown in FIG. 8A, the fiber optic device 140 is surrounded by a substrate 404a and 404b, each having a trough to accommodate the fiber optic device and the optical fibers. The substrates 404 are preferably formed of fused quartz and having a surface layer consisting essentially of aluminum. The substrates 404 are brought together, for example, using external support arms 405, to form the enclosure 430 shown in FIG. 8B. A pair of end rods 432 are then moved toward the end portions 414a and 414b, which align the substrates 404a and 404b along the fiber optic axis in FIG. 8C. In addition, the end rods 432 maintain the enclosure 430 while the support rods 405 are removed.

Figure 8D:
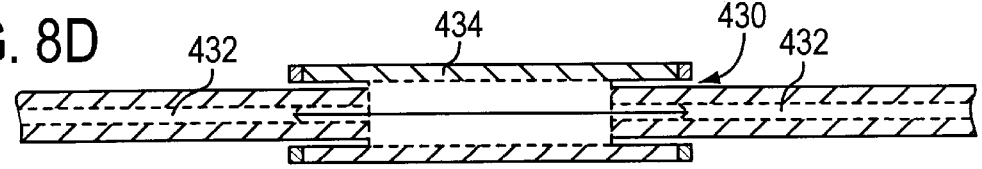

As shown in FIG. 8D, a sleeve 434 consisting essentially of pure aluminum is then threaded over the enclosure 430. The sleeve 434 has an inner diameter slightly greater than the outer diameter of enclosure 430 and a length slightly greater than the enclosure 430.

Figure 8E:
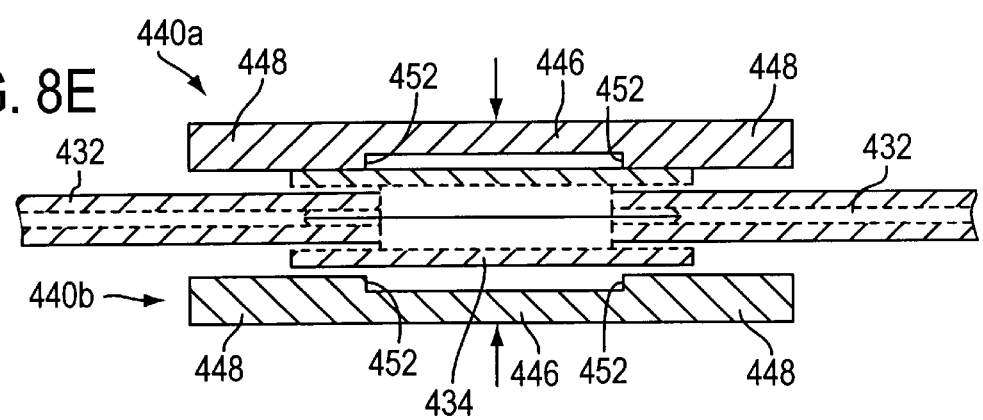

As shown in FIG. 8E, two molds 440a and 440b engage the outer diameter of the sleeve 434. The mold portions 440a and 440b each have semi-circular shapes along their axial lengths and a center section 446 spaced from the outer diameter of the sleeve 434 and end portions 448 in contact with the ends of the sleeve 434. The edges 452 are disposed axially outwardly from the middle body portion of the enclosure 430.

Figure 8F:
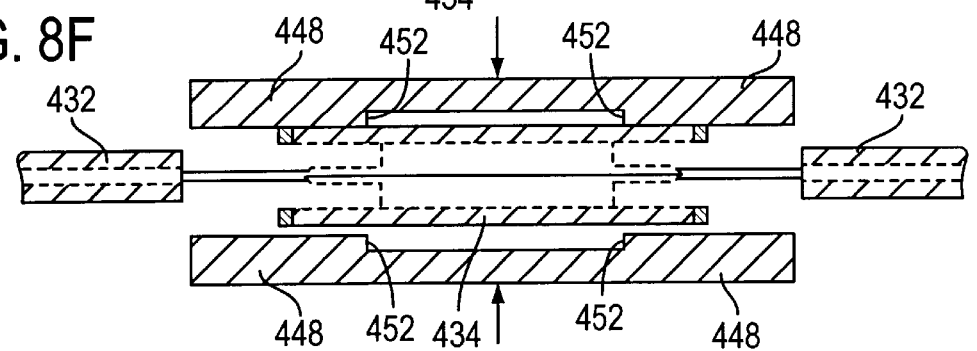
Figure 8G:
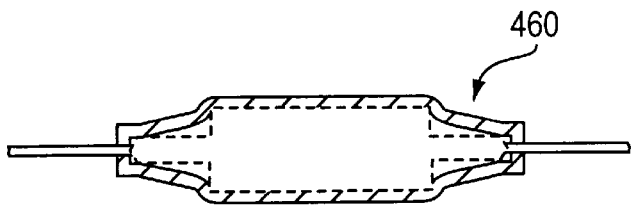

The mold portions 440a and 440b exert sufficient pressure on the sleeve 434 to maintain the position of the sleeve 434 and the enclosure 430, enabling the end rods 432 to be moved as shown in FIG. 8F without moving the substrates 404a, 404b, or the sleeve 434.

Each of the mold portions 440a and 440b include heating elements, causing the sleeve 434 and the aluminum surfaces of the substrates 404 to be heated to just below their corresponding melting point, at which point the molds 440a and 440b compress the metal sleeve to form a hermetic seal around the enclosure 430 and the enclosed optical fibers. Heating of the tubing 434 to just below its melting point causes the tubing 434 and the surface metal layers of the substrate 404 to begin to fuse together during the heating and compression by the mold portions 440a and 440b. As the aluminum cools, the aluminum surfaces and the tubing 434 fuse together and compress to form a compressive seal around the quartz portion of the enclosure 430 and the enclosed fiber optic device 140, forming the hermetically sealed device 460 of FIG. 8G.

Additional details regarding the method of hermetically sealing according to FIGS. 8A–8G are disclosed in co-pending application Ser. No. 08/763,052, filed even date herewith, now U.S. Pat. No. 5,805,757 entitled "Fiber/Optic Device Hermetically Sealed by Heating and Compressing Metal Seals and Method for Making the Same," (Attorney Docket No. 2986-005), the disclosure of which is incorporated in its entirety herein by reference.

Figure 9A:
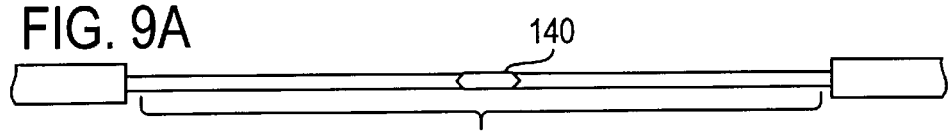
FIGS. 9A–9F illustrate an alternative method of hermetically sealing the fiber optic device according to another embodiment of the present invention.
Figure 9B:
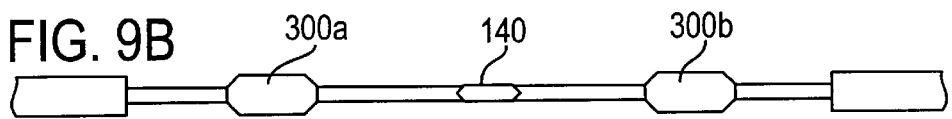
Figure 9C:
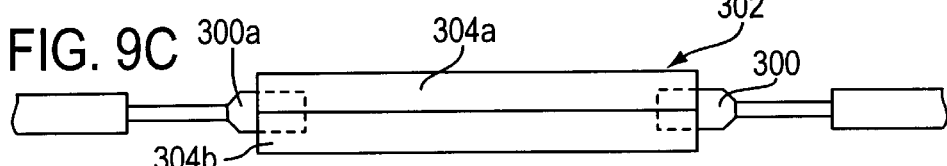

An alternative technique of hermetically sealing the fiber optic device is disclosed in co-pending application Ser. No. 08/679,059, filed Jul. 12, 1996, now U.S. Pat. No. 5,680,495, entitled "Fiber Optic Device Hermetically Sealed by Compressed Metal Seals and Method for Making the Same," (Attorney Docket No. 2986-001), the disclosure of which is incorporated in its entirety by reference. FIGS. 9A–9F correspond to FIGS. 8A–8F of that application disclosing an alternative method for hermetically sealing the fiber optic device. As shown in FIG. 9A, the fiber optic device 140 has metal seals 300a and 300b formed on each side of the optical fiber, for example by using molds to inject molten aluminum onto the optical fiber. As the molten aluminum cools, the aluminum bonds with the optical fibers, and forms a compressive seal on the optical fibers. Once the metal blocks 300 are formed, an enclosure 302 composed of upper and lower portions 304 are placed surrounding the metal seals 300. Each of the portions 304 are preferably quartz-bodies having a first surface layer of pure aluminum and an outer layer of gold. The portions 304 include a trough running along the optical fiber axis, that provides a spaced enclosure for the optical fibers and the fiber optic device 140. In addition, the internal aluminum and gold layers of the portions 304 engage the metal blocks 300a and 300b to form a secure seal when compressed, as shown in FIG. 9C. The enclosure 302 is preferably assembled in an oxygen-free atmosphere, for example an atmosphere having a positive pressure of nitrogen, helium or argon.

Figure 9D:
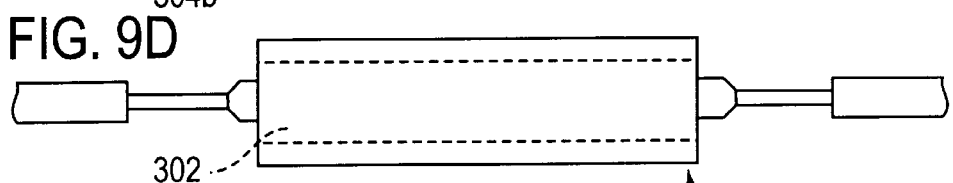

After formation of the enclosure 302, a tubing 306 is threaded over the enclosure 302, shown in FIG. 9D. The tubing 306, formed of fused silica, includes a deformable metal interface layer, such as the aluminum/gold interface layer on the inner and outer surfaces of portions 304a and 304b. The tube 306 has an inner diameter which is slightly less than the outer diameter of the enclosure 302. Hence, the deformable metal interface layer on the inner surface of tubing 306 interacts with the deformable interface layer on the outer surface of the enclosure 302 to form a gas-tight enclosure exerting a compressive force on the enclosure 302. The gas-tight enclosure is formed by the displacement of the respective deformable metal layers. The tubing 306 exerts a compressive force to provide additional sealing between the tubing 80 and the substrates 304a and 304b of the enclosures and to provide compressive force to maintain the hermetic seal between the substrates 304a and 304b and the metal block 300. Ultrasonic welding may also be used to seal the contacting metal layers.

Figure 9E:
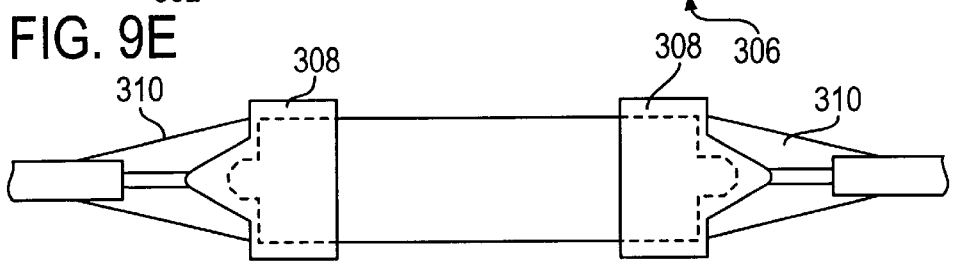

After sealing the tubing 306 as shown in FIG. 9D, gold caps 308 are added onto each end of the tubing 306 to cover the ends of the tubing 306, and the ends of the metal seals 300. The gold caps 308 consist essentially of gold. The caps 308 may be prethreaded on the optical fibers, or may be attached by crimping a sheet of gold metal at each end. As the gold caps 308 are compressed at each end of the tubing 306, the portions of the metal blocks 300 extending from the tubing 306 are partially deformed with the caps 308. The exposed optical fibers are then coated with a conventional sealing material 310, for example rubber, as shown in FIG. 9E.

After the exposed optical fibers have been covered by the sealant 310, a protective metal tubing 312, formed of a nickel-based alloy, for example, Invar, is threaded over the assembly. If desired, a non-metal tubing having a relatively low thermal expansion coefficient may also be used. After loosely fitting the metal coating 312 over the assembly, the metal coating 312 is secured by injecting into the space between metal coating 312 and the assembly a sealant, for example, an RTV (room temperature vulcanizing) silicon coating 314.

After the fiber optic device 140 has been hermetically sealed to form the hermetically-sealed fiber optic device 50, the completed fiber optic device 50 can be moved as described above with respect to FIGS. 11 and 14 for testing.

Figure 9F:
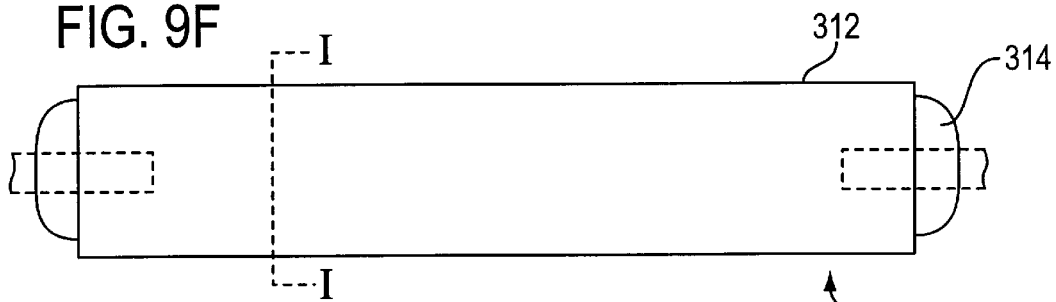
Figure 10:
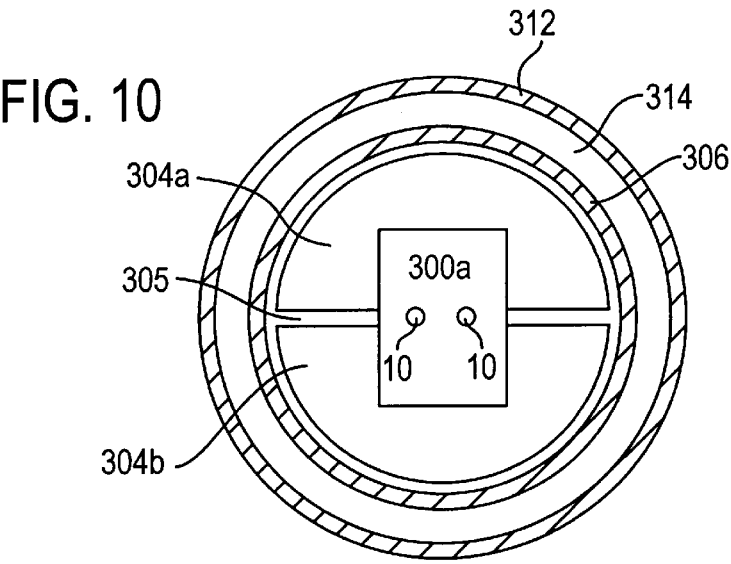
FIG. 10 is a diagram illustrating a cross-section of the sealed fiber optic device of FIG. 9F.

FIG. 10 is a cross-section of the hermetically sealed device taken along lines I—I of FIG. 9F. FIG. 10 shows the portion of the body 304a having an internal quartz body with an interface layer 305 fused between the quartz portions 304a and 304b. As shown in FIG. 10, the metal interface layer 305 surrounds the quartz portion of the bodies 304a and 304b and forms an interface layer between the quartz bodies and the tubing 306. In addition, the metal block 300a encapsulates the optical fibers 10, forming a hermetic seal for the fiber optic device 140 enclosed by the hermetic seal.

After hermetic sealing, a transport arm 42 is connected to the fiber optic device 50, as described above with respect to FIG. 11, and the fiber optic device 50 is transported to a testing station 58b as shown in FIG. 14B. As shown in FIGS. 14A and 14B, the testing station 58b includes a set of clamps 228, and splicers 229 for splicing the ends of the optical fibers to leads 232 from an optical switching assembly 230.

Figure 15:
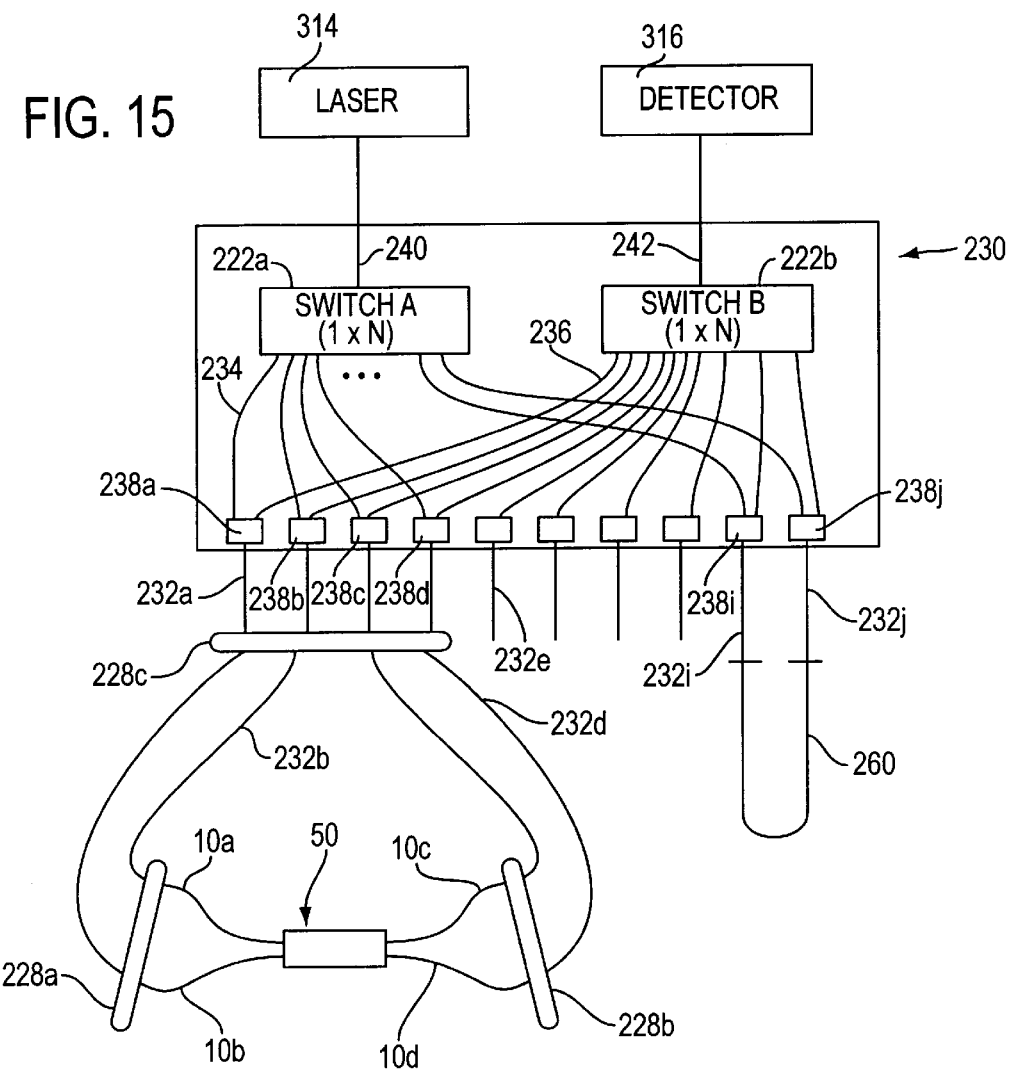
FIG. 15 is a diagram showing in detail the testing station of FIGS. 14A and 14B.

FIG. 15 is a diagram illustrating in detail the testing assembly 58b of FIGS. 14A and 14B including the switching assembly 230. The splicers 229 splice the ends of the optical fiber from the fiber optic device 50 (referred to herein as leads 10a, 10b, 10c, and 10d) to the leads 232 of the optical switching assembly. After the fiber optic leads of the fiber optic device 50 are fusion spliced to the optical switching assembly 230 by the splicers 229, the switching assembly 230 selectively establishes optical paths between a test laser 314 and a detector 316 to verify the optical performance of the device under test, namely the fiber optic device 50.

As shown in FIG. 15, the optical switching assembly 30 includes two 1×N switches 222a and 222b, a first group of optical fibers 234, a second group of optical fibers 236, and a plurality of junctions 238.

Figure 16A:
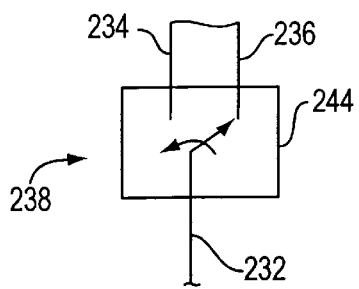
FIGS. 16A and 16B are diagrams illustrating alternative implementations for the junctions of the optical switching assembly of FIG. 15.
Figure 16B:
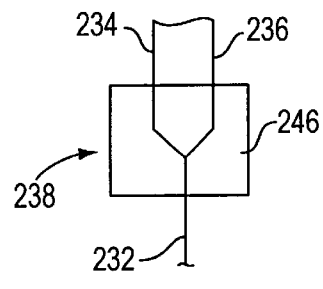

FIGS. 16A and 16B are diagrams illustrating alternative implementations of the junctions 238 of FIG. 15. The junction 238 of FIG. 16A is implemented as an optical 1×2 switch 244 that selects between one of the first group of optical fibers 234 and the second group of optical fibers 236 for connection with the corresponding lead 232. The junction 238 may also be implemented as a passive coupler 246, shown in FIG. 16B, that connects one of the optical fibers from each group 234 and 236 with the corresponding lead 232.

Figure 17:
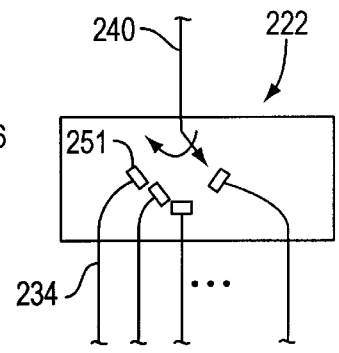
FIG. 17 is a diagram illustrating the optical switches of the optical switching assembly of FIG. 15.

FIG. 17 is a block diagram illustrating in detail one of the switches 222 of FIG. 15. The switch 222 is preferably a 1×N switch, where the control system 36 of FIG. 1 selectively connects a terminal end, for example lead 240, to one of the first group of optical fibers 234. An exemplary optical switch is the commercially available fiber optic switch by DiCon Fiber Optics, Inc., Berkeley, Calif., Model No. MC601. The switch 222 has a maximum insertion loss of −1.3 dB (−0.6 dB typical), and a maximum back reflection of −55 dB (−60 dB typical) at wavelengths of 1310 and 1550 nm (broadband). Short term repeatability should be +/−0.005 dB. Each of the optical fibers 234 connected to the switch 222 are terminated within the switch 222 by a Graded Refracted Index (GRIN) rod lens 251 that provides minimal insertion loss and maximum coupling efficiency. Each optical fiber is also angled and coated with an anti-reflective coating to minimize back reflectance in the event that the particular optical fiber 234 is not connected to the optical fiber 240 by the switch 222. The GRIN lens 251 is preferably a quarter-wavelength (0.25) pitch.

As shown in FIG. 15, the fiber optic device 50 is connected to the optical fiber leads 232 of the optical switching assembly 230 by fusion splices after the ends are secured to the clamps 228a and 228b. Each lead 10 of the fiber optic device is connected to a corresponding lead of one of the junctions 238 of the optical switching assembly 230. The laser 314 is connected to the switch A 222a via an optical fiber 240, and the detector 316 is connected to switch B 222b via an optical fiber 242. All fibers are preferably single mode fibers.

Once the fiber optic device 50 is connected to the switching assembly 230, the switches 222 are controlled so that the laser 314 supplies laser energy to only one of the first group of optical fibers 234, and the detector 316 receives transmitted light energy from only one of the second group of optical fibers 236. For example, assuming that switch A was set to route light received from the light source 314 to the junction 238a, and switch B was set to route light received from junction 238a to the detector 316, the test assembly would be able to automatically determine the back reflectance of light from lead 10b of the fiber optic device 50 via the lead 232a. After testing for back reflectance, the coupling ratio of leads 10c and 10d relative to light input to lead 10b can be determined by successively setting the switch B to transmit light to the detector 316 light received from lead 232c, measuring the detected light, and then switching the switch B 222b to route the light from lead 232d to the detector 316. In addition, near-end crosstalk of the coupler S0 can be determined by maintaining switch A 222a to input light to the lead 232a, and setting the switch B 222b to route light received from lead 232b to the detector 316.

Hence, the optical fiber device S0 can be tested in any desired manner without the necessity of disconnecting and reconnecting leads to the optical fiber device. Variations in the coupling losses in the optical fiber assembly 230 may be quickly identified before each test by switching the optical switches 222a and 222b to junctions 238i and 238j having leads 232i and 232j fusion spliced with a single optical fiber 260, also referred to as a loopback fiber, that enables the detector 316 to quickly measure the loss of the optical switching assembly 230, or optical characteristics of the laser 314, for example laser power, wavelength, polarization state, etc. Variations can be detected by comparing the detected value of the loss during connection to the loopback fiber 260 with previously-stored values. Variations can also be detected by switching the optical switches 222a and 222b to lead 232e, which is terminated with a commercially-available external reference reflector (−35 to −40 dB) (not shown). Alternately, the end of fiber 232e can be cleaved by scoring the fiber end using a diamond tip perpendicular to the length of the fiber.

Additional details found in co-pending application Ser. No. 08/725,641, filed Oct. 1, 1996, now U.S. Pat. No. 5,764,348, entitled "Optical Switching Assembly for Testing Fiber Optic Devices," (Attorney Docket No. 2986-003), the disclosure of which is incorporated in its entirety by reference.

According to the present invention, a method for making fiber optic devices is completely automated to maximize production efficiency, yield, and reliability. The automated arrangement for making fiber optic devices includes the threading of optical fibers from spools, making the fiber optic device, hermetically sealing the fiber optic device, testing the fiber optic device, and packaging the fiber optic device for shipment. The entire manufacturing process can be controlled by a central controller, or individual controllers that communicate between each other via a local area network.

The disclosed embodiments may also be modified to perform additional operations prior to packaging a fiber optic device. For example, the testing station 58b may be supplemented or substituted with a long-term reliability testing station, where a plurality of fiber optic devices undergo long term testing in a stressed environment having high temperatures and high humidity to determine long term optical performance. Alternately, the fiber optic devices may be sent to a station that automatically terminates the ends of the optical fibers with fiber optic connectors such as ferrules. An exemplary arrangement for terminating optical fibers that could be implemented in the disclosed automated system is disclosed in copending application No. 08/763,125, filed on even date herewith, now U.S. Pat. No. 5,815,619 entitled "Fiber Optic Device Hermetically Sealed Using Only Aluminum" (Attorney Docket 2986-004), the disclosure of which is incorporated in its entirety by reference.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

I claim:

1. A method of automating fabrication of a fiber optic device, comprising:

securing an end of a first optical fiber into a stationary gripping device;

transferring the end of the first optical fiber to one of a plurality of movable gripping devices;

moving the end of the first optical fiber along a prescribed path using at least the one movable gripping device, the prescribed path coinciding with positions of at least one device to be threaded by the first optical fiber and primary clamps mounted on first and second stages, respectively;

securing the first optical fiber to the two primary clamps;

applying incident heat on the first optical fiber between the two primary clamps with a heat source;

selectively moving the stages along an optical fiber axis to pull the heated first optical fiber at a pulling velocity;

detecting at the end of the first optical fiber an optical characteristic of the first optical fiber;

controlling the incident heat and the pulling velocity on the first optical fiber, based on a change in the detected optical characteristic, to form the fiber optic device;

hermetically sealing the fiber optic device while maintaining a prescribed position of the end of the fiber optic device;

securing the fiber optic device to a transport device relative to the end of the first optical fiber and a cut end of the first optical fiber; and moving the fiber optic device from the primary clamps and the movable gripping devices while maintaining a prescribed position of the end and the cut end of the fiber optic device relative to the transport device.

2. The method of claim 1, wherein the moving step comprises:

moving the end of the first optical fiber along a first segment of said prescribed path using the one movable gripping device;

handing off the end of the first optical fiber from the one movable gripping device to a first adjacent movable gripping device;

moving the end of the first optical fiber along a second segment of said prescribed path and through the at least one device to be threaded using the adjacent movable gripping device; and handing off the end from the adjacent movable gripping to a second movable gripping device adjacent to the first adjacent movable gripping device.

3. The method of claim 1, wherein the first optical fiber is a coated optical fiber, the method further comprising:

securing the coated first optical fiber to secondary clamps movably positioned on the first and second stages, respectively, the primary clamps on the first and second stages positioned between the corresponding secondary clamps;

stripping the coated optical fiber to expose a segment of the optical fiber; and wherein the primary clamps securing step comprises securing the exposed segment of the first optical fiber to the two primary clamps.

4. The method of claim 3, further comprising:

securing an end of a second coated optical fiber into a second stationary gripping device;

transferring the end of the second coated optical fiber to one of a second plurality of movable gripping devices;

moving the end of the second coated optical fiber along at least a portion of said prescribed path including said at least one device and said primary clamps;

securing the second coated optical fiber to a second set of secondary clamps movably positioned on the first and second stages, respectively, the primary clamps on the first and second stages positioned between the corresponding second set of secondary clamps;

stripping the second coated optical fiber to expose a segment of the second optical fiber; and securing the exposed segment of the second optical fiber to the two primary clamps.

5. The method of claim 1, wherein the primary clamps securing step comprises:

placing an exposed portion of the first optical fiber within each of the primary clamps;

imparting a suction force on the first optical fiber within each of the primary clamps;

covering each of the primary clamps with a clamp housing having a segment for engagement with the exposed portion of the optical fiber; and imparting a second suction force on each clamp housing from the corresponding primary clamp.

6. The method of claim 1, further comprising:

securing the first optical fiber to secondary clamps movably mounted on the first and second stages, the primary clamps positioned between the secondary clamps;

releasing the first optical fiber from one of the secondary clamps;

moving the threaded device along the first optical fiber and across the one released secondary clamp to a position between the released secondary clamp and the corresponding primary clamp;

reclamping the first optical fiber in the released secondary clamp;

releasing the first optical fiber from the primary clamp adjacent to the moved threaded device;

moving the threaded device along the first optical fiber and across the one released primary clamp to a position between the primary clamps; and reclamping the first optical fiber in the released primary clamp.

* * * * *